United States Patent
Simoniy et al.

(10) Patent No.: US 12,485,567 B2
(45) Date of Patent: Dec. 2, 2025

(54) ELECTRONIC JIG ADVANCED SYSTEM (EJAS) FOR WORKPIECES JOINERY

(71) Applicant: Eran Simoniy, Regavim (IL)

(72) Inventors: Eran Simoniy, Regavim (IL); Ziv Simoniy, Regavim (IL)

(73) Assignee: Eran Simoniy, Regavim (IL)

( * ) Notice: Subject to any disclaimer, the term of this patent is extended or adjusted under 35 U.S.C. 154(b) by 427 days.

(21) Appl. No.: 18/030,069

(22) PCT Filed: Sep. 29, 2021

(86) PCT No.: PCT/IB2021/058975
§ 371 (c)(1),
(2) Date: Apr. 3, 2023

(87) PCT Pub. No.: WO2022/070118
PCT Pub. Date: Apr. 7, 2022

(65) Prior Publication Data
US 2023/0373126 A1    Nov. 23, 2023

Related U.S. Application Data

(60) Provisional application No. 63/086,624, filed on Oct. 2, 2020.

(51) Int. Cl.
*B27F 1/12*        (2006.01)
(52) U.S. Cl.
CPC .................................... *B27F 1/12* (2013.01)
(58) Field of Classification Search
CPC . B23Q 3/005; B23Q 3/06; B23Q 3/16; B23Q 5/22; B23Q 5/225; B23Q 5/52; B23Q 7/04; B23Q 7/041; B23Q 7/046; B23Q 7/047; B27F 1/02; B27F 1/04; B27F 1/08; B27F 1/10; B27F 1/12; B27F 1/16; B27C 5/02; B27C 5/04; B27C 5/06; B27C 9/02
See application file for complete search history.

(56) References Cited

U.S. PATENT DOCUMENTS 3,477,320 A    11/1969  Findley
5,592,793 A    1/1997   Damratowski et al.
(Continued)

FOREIGN PATENT DOCUMENTS

RU        2572111        12/2015

OTHER PUBLICATIONS

Denkena et al., "Influence of the cutting tool compliance on the workpiece surface shape in face milling of workpiece compounds", ScienceDirect, 2015, retrieved on [Dec. 20, 2021].Retrieved from the internet entire document.

*Primary Examiner* — Matthew Katcoff
(74) *Attorney, Agent, or Firm* — Reches Patents

(57) ABSTRACT

A system for forming a joint, the system may include a controller; and a hold and movement unit that is configured to: (a) hold a first cuttable element while the first cuttable element is being cut by a cutting element during multiple first cut iterations; and (b) execute, under a control of the controller, first movement commands for moving the first cuttable element, along a first axis, between one cut iteration to another to form a first requested pattern of recesses. The first movement commands are generated based on a user request regarding the joint, and one or more cutting element parameters.

28 Claims, 28 Drawing Sheets

(56) References Cited

U.S. PATENT DOCUMENTS

| | | | | |
|---|---|---|---|---|
| 5,662,019 | A * | 9/1997 | Denman | B27C 1/12 83/438 |
| 6,189,682 | B1 * | 2/2001 | Hill | B27M 1/08 144/250.15 |
| 6,202,521 | B1 | 3/2001 | Rossetti et al. | |
| 7,255,144 | B2 * | 8/2007 | Smith | B27C 5/04 83/435.11 |
| 7,347,233 | B2 * | 3/2008 | Freidlund | B27B 25/10 144/144.1 |
| 10,532,414 | B2 * | 1/2020 | Smith | B27B 27/02 |
| 10,668,643 | B2 * | 6/2020 | Friese | B23Q 3/00 |
| 2006/0251480 | A1 | 11/2006 | Mann et al. | |
| 2018/0050431 | A1 | 2/2018 | Kitakaze | |
| 2020/0051457 | A1 | 2/2020 | Becker et al. | |
| 2020/0282470 | A1 * | 9/2020 | Duginske | B27C 5/04 |

* cited by examiner

315

310

318

313

410

Start to cut

SELECT THE BOARD TYPE A OR B

◉ Board A represent the first Finger Join Board
◉ Board B represent the offset Finger Join Board

412

ELECTRONIC JIG ADVANCED SYSTEM (EJAS) FOR WORKPIECES JOINERY

TECHNICAL FIELD

The present invention relates to machine and method for guiding a joint jig for cutting workpieces to form joints that may be formed between different pieces. In particular, the present invention pertains to high precision electronic machine and corresponding method for cutting workpieces to form such joints in different shapes, numbers and configurations.

BACKGROUND

Joint members in woodwork pieces include, for example, finger joints, dovetail joints, Morson joints and tenon joints.

A non-limiting example of a jig apparatus with a fixed template is illustrated in U.S. Pat. No. 8,534,329. The fixed template is planar template and includes a plurality of outward extending fingers, spaced apart from each other in a certain width. The template is fixed to a positioning beam and a template guide and pins are used to locate it on the beam. The board may be shifted on and locked to the beam in different relative positions to form the joints on one side of a workpiece and then the complementing joints or slots on the second workpiece. In this apparatus, the number of fingers is pre-set for every template on one of its sides. Therefore, to form joints with a different number and corresponding slots on a side of a workpiece or joint shapes requires planar templates with different finger configurations.

Some tools require to replace cutting tools (for example using saws of different thickness) to form a desired pattern.

Other example of jog apparatuses are illustrated in US patent application 2006/0249228, U.S. Pat. No. 7,997,308, US patent application 2016/0311128, and U.S. Pat. No. 7,082,974.

None of these publications offer or suggest apparatus or machinery in which the different parameters that determine the character of a joint can be dynamically set. Particularly, they are limited in choosing the shape of a joint, its dimensions and 'varying distance between neighbour joints and its degree of accuracy. Alternatively, they provide complex machinery or apparatus, which are also complicated to operate.

In today's methods and machineries, a user needs to change the jig and/or the template and adjust the setups of the cutting tool with a complex calculation to create an accurate joint. Industrial methods and machinery in the current market must use a particular guide template and/or a particular saw and/or a particular router bit for every joint design. In addition, in such methods and machinery it is necessary to move between different joint shapes and configurations, for example such finger joint, dovetail joint, mason and tenon joint. In the current market there does not exist a jig, which is used with a computed electrical movement system combined with different kinds of joinery systems.

In addition, inside the design of a particular method, i.e. finger joint, it is necessary to change the gap or the distance between cutting teeth, change the cutting element, and the user needs to recalibrate the setup and/or change the saw and/or change the jig.

There is a growing need to provide an accurate, easy to control, adjustable and cost-effective machine for forming joints.

SUMMARY

There may be provided a system for forming a joint, the system may include a controller; and a hold and movement unit that is configured to: (a) hold a first cuttable element while the first cuttable element is being cut by a cutting element during multiple first cut iterations; and (b) execute, under a control of the controller, first movement commands for moving the first cuttable element, along a first axis, between one cut iteration to another to form a first requested pattern of recesses. The first movement commands are generated based on a user request regarding the joint, and one or more cutting element parameters.

There may be provided a method for forming a joint, the method may include holding, by holding and movement unit, a first cuttable element while the first cuttable element is being cut by a cutting element during multiple first cut iterations; and executing, under a control of a controller, first movement commands for moving the first cuttable element, along a first axis, between one cut iteration to another to form a first requested pattern of recesses. The first movement commands are generated based on a user request regarding the joint, and one or more cutting element parameters.

BRIEF DESCRIPTION OF THE DRAWINGS

In order to illustrate the embodiments of the present invention or the technical solutions more clearly in the prior art, the drawings to be used in the embodiments or the description of the prior art will be briefly described below. Obviously, the drawings in the following description represent only some embodiments of the present invention, and those skilled in the art can obtain other drawings according to these drawings without any creative work.

DETAILED DESCRIPTION OF THE DRAWINGS

Figure 1:
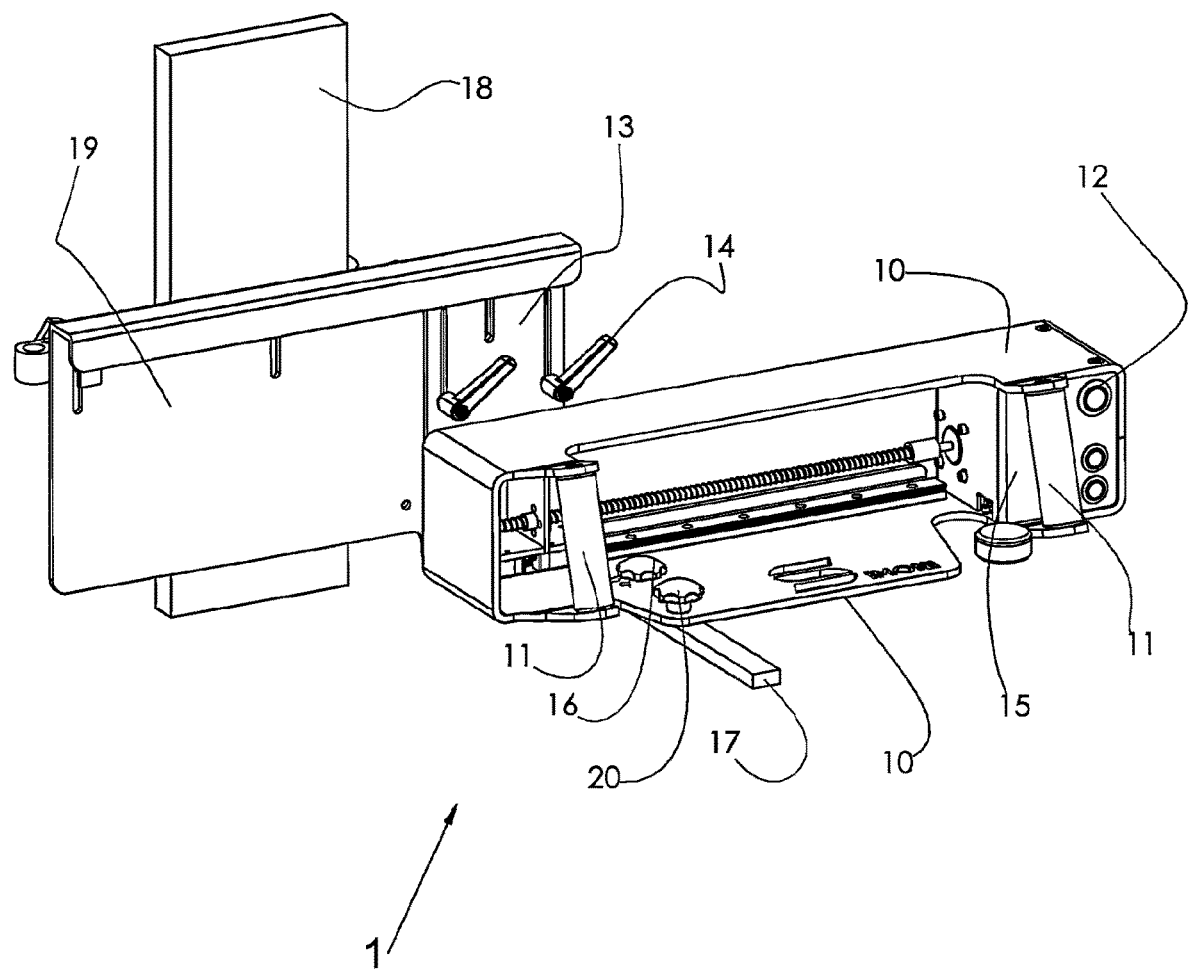
FIGS. 1-8 illustrates examples of a system.
Figure 2:
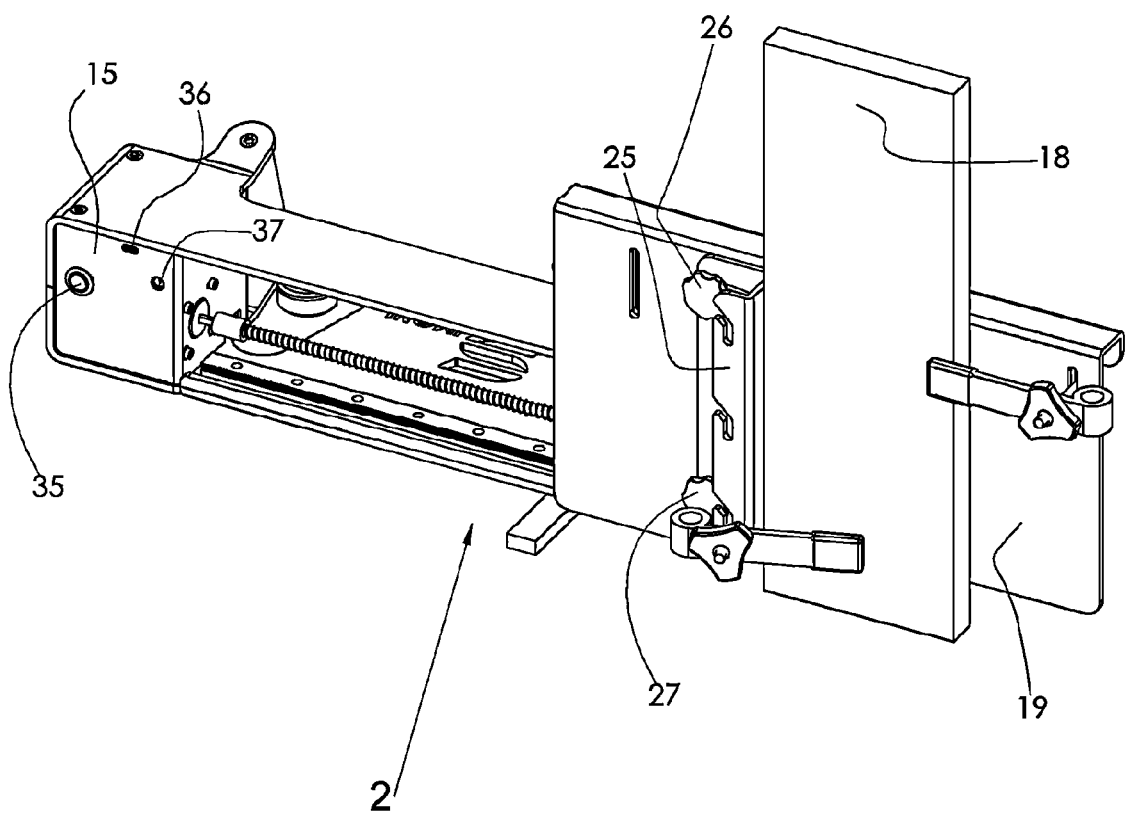

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic and/or mechanical components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any reference to the term "comprising", having, "including" may be applied mutatis mutandis to "consisting" and/or may be applied mutatis mutandis to "consisting essentially of". For example—the system may include the elements illustrated in FIGS. 1-7 (and even to additional elements not shown). Yet for another example—the system may include such elements—but may be limited to elements illustrated in FIGS. 1-7—for example with an optional addition of insignificant components.

The suggested solution greatly simplifies the formation of joints—it may require the user to input a limited number of parameters (for example between 1 and 3) of a pattern—and the user may also select between know patterns of joints—further simplifying the process. In various types of joint the user does not need to perform many measurements, calculate offsets, and the like—as the solution performs most of the calculations. The solution may be based on an accurate movement along a single axis (referred to a first axis) which simplifies the system and reduces costs. Yaw and roll angles can be set manually and maintain the same during multiple cut iterations.

The present invention given the ability to replace joint connectors by operating operate CNC expensive and complex machine from one hand and fixing iron fixture cutting template for joint connectors from other hand The present embodiment will be described in detail below in conjunction with specific embodiments. The following examples will be further understood by those skilled in the art, but are not intended to limit the embodiment in any way. It should be noted that a number of variations and modifications can be made by those skilled in the art without departing from the spirit of the embodiment. These are all within the scope of protection of the present embodiment.

It is, therefore, an object of the present embodiment to provide an electrically operated and computer-controlled machine for digitally setting the different parameters of joints and providing complete control on them It is yet another object of the present embodiment to provide an electrically operated and computer controlled joint cutting machine that accurately sets shapes of joints, spaces, widths and angles between them and highest accuracy and repeatability of joint cuts.

It is yet another object of the present embodiment that this joint cutting machine is using in one blade thickness to create any width of tooth with a single blade thickness It is yet another object of the present embodiment that this joint cutting machine is configured make symmetric cuts for every size of woodwork and joint in maximal speed and with no need for complex calculations.

It is yet another object of the present embodiment that the joint cutting machine is configured to choose the pressure and overlap of any different woodwork pieces, joint to each other in maximal precision.

It is yet another object of the present embodiment that the joint cutting machine is configured to generate new types of joints and at the same time accurately repeat the cutting of any type of joint with no obligation to a particular pre-set pattern—and in some cases only the cutting element parameters (width and/or type) are required.

It is yet another object of the present embodiment to share any design of joint pattern among users and implement any joint cutting plan quickly without any need or obligation to a fixed present pattern. The solution fits the pattern formed in a cut element to the type of pattern and one or few parameters provided by the user.

It is yet another object of the present embodiment that the joint cutting machine is configured to cut joint patterns even in small woodwork pieces simply by adapting height in the machine.

It is yet another object of the present embodiment that the joint cutting machine is configured to cut joints identical to each other even when the cutting tool is lifted to maximal height—for example 'tongue and groove' for forming deep recesses.

It is yet another object of the present embodiment to provide a method for cutting joints in a workpiece with the electrically operated and computer controlled joint cutting machine of the present embodiment.

This and other objects and embodiments of the present embodiment will become apparent as the description proceeds.

In one aspect, the present embodiment is aimed at cutting joints and spaces between them in highest accuracy possible, by combining an electrical step motor, which is controlled by a software application. This software application controls and calculates the steps of a finger joint in accurate steps of different cut widths and angles with a single saw thickness without any additional calibration, finger rearrangements, shifting or replacing. For example, saw thickness which is equal to 3 mm can cut any joint thickness from 3 mm to 30 cm—and even more. By shifting a cut product along its cut dimension—a formed portion of the pattern can be repeated for virtually any number of times.

A width of a recess formed during multiple cut iterations may be a whole product of the thickness of the cutting element—but may be a fractional product of the thickness of the cutting element. For example—assuming a saw thickness of 3 mm—the recess may be 3, 6, 9, 12 mm and the like but may also be 4, 7, 9, 5 mm wide—and the like.

The system may receive and hold multiple cuttable elements at once—for example it may hold board A and board B simultaneously—and may cut one board after the other even without replacing the boards. For example—the boards may be positioned one after the other and both held by the system.

The system provides an excellent trade-off between cost and performance—it may generate patterns of many types while being relatively compact and of complexity that is a fraction of complex CNC systems.

In one embodiment, the system of the present embodiment and working material are directed to the professional and DIY (Do It Yourself) markets.

In one particular aspect, the present embodiment provides the following advantages over the current cutting and joining apparatuses and machineries: An electrically operated jig system for all joint methods using an existing table saw or router table; A mobile or wired application control and calibration of the electrical jig; High precision and repetition of the movement forward and backwards without moving or changing the position of the cutting material; A single saw apparatus to create different joinery jigs; A single saw to create different cut gaps and spaces; A single jig to create different joint angles; Creating hand cut design as in different mechanical joint methods.

In still another aspect, the apparatus and method of the present embodiment comprise and integrate three major components to control the cut, measurements, and position of the selected jig plan against the cutting tool. Particularly, the cutting tool is not part of the system and the Electrical Advance Jig System (EAJS) of the present embodiment can fit, as an accessory or standalone, to any cutting machine as a table saw, router, skill saw, etc, namely SW, HW and mechanical means.

In still another aspect, the advantages of the machine and method of the present embodiment comprise the following:

A single jig that replaces several HW jig applications in one consolidated HW.

In particular, the EAJS is configured to replace a finger joint jig of a plastic or aluminium templates and a press finger joint jig; a dovetail joint of a plastic aluminium templates or press 'dovetail joint' jig; and a 'Merson and tenon' joints. The system may generate virtually any pattern—using the same one or more cutting elements. and tongue and groove' and 'Box Joint' indifferent tooth width and tooth space design The EAJS of the present embodiment also reduces the use of several saw types and thicknesses, namely dado saw, to create shapes in different thicknesses and at different angles.

The ability to work with one cutting tool type to create accurate cuts forward and return backwards simplifies the complexity of creating decorative fasteners and lowers the costs of buying multiple saw types and different jigs system and templates to create different joint shape such as dovetail jig, finger Box joint jig, dado saw and additional shape of router bits.

The transition between the types of design, between the thicknesses and angles of the various connectors requires re-adjustment of the setup and replacement of the cutting tool accordingly. Usually in current machineries and apparatuses, re-adjusting the system and restoring the steps of cutting a series of joints is time consuming. However, the EAJS of the present embodiment carries this out in a continuous process in a single command to initiate it according to a computer stored plan of operation.

Further to the above, the system of the present embodiment provides a computer controlled and operated application. Namely, the EAJS controls the mechanics and defines the accurate moving distance against the cutting tool via an electric circuit that can be controlled with a mobile app, desktop, cloud or electrical controller placed on the EAJS chassis.

Further, in one embodiment, control of the system can be done parallel. Namely, control can be made via an application, while the user can control the movement of the cutting plan and the individual steps from the EAJS itself with analog controllers such as buttons, switches, touch screens and analog buttons.

The EAJS may include its own man machine interface—which may ease the control of the EAJS.

The mechanics and hardware of the system is built from accurate mechanical rails and takes into consideration the calculation to cut accurately according to a selected plan, based on requirements to cut a jig type that may be selected from 'box joint', 'tongue and groove' 'dovetail joint' etc.

A user may be displayed various plans and may select which plan to implement. The plans may be obtained in any manner—in response to user requests, based on images or any other type of information.

The EAJS may include a display or any other means for interacting with the user (instead or in addition to the analog buttons). The interaction may require a touch screen and/or keyboard and/or mouse or joystick or a voice-based interaction and the like. The display may be located at any location—as a part of the hold and movement unit, as an augmented reality device (for example glasses), may be mechanically coupled to the hold and movement unit, and the like.

FIGS. 1-8 illustrates various examples of a system.

The following reference numbers are used in FIGS. 1-8:

| | |
|---|---|
| 10. | Main chassis |
| 11. | Technical grip handles (held by the user while moving the system along a second axis) |
| 12. | Analog control button - for reporting a completion of a cut iteration |
| 13. | Fix Plate - movable (along Z axis) in relation to the material holder plate 19 |
| 14. | Ratchets for locking (after height is set) the fix plate to the material holder plate. |
| 15. | Electronic system (includes controller and may include communication unit) |
| 16. | First knob - may move within a recess (formed in a base of the main chassis) about an axis defined by second knob 20 - to determine the yaw angle. |
| 17. | Leading rail - moves within the recess (not shown) while maintaining yaw angle |
| 18. | Cut element (first or second) |
| 19. | Material Holding plate |
| 20. | Second knob - yaw angle axis of rotation - may pass through an opening formed within the base of the main chassis. |

24. Refers to a start position - in which the cut elements is aligned (has its edge contact a side of) the cutting element. The alignment process is also referred to as a calibration.
25. Linear fences hold the carting material
26. Third knob - may move within a recess about an axis defined by fourth knob 27 - to determine the roll angle
27. Fourth knob - defined the roll angle axis of rotation
24. Zero Position between the cutting material and cutting tool
30. Forward Analog Button - report completion of cut iteration
31. Backboard Analog Button - request to restart last cut iteration
32. Home Analog Button - request to restart a formation of a requested pattern of recesses
33. Microswitch - part of safety mechanism preventing a start of movement of the holding and movement unit towards the cutting element until there is at least a predefined distance between the first cuttable element and the cutting element. The predefined distance is sensed when the microswitch is contacted by a mechanical element such as Magnet Microswitch pusher 34 formed in (or attached to) the environment of the system
34. Magnet Microswitch pusher - may be stationary. When the system moves towards the magnet microswitch pusher - the latter may move within a recess formed within the base of the main chassis.
35. Power Button
36. Technical Port (communication port)
37. Power Jack
40. Step Motor
41. Linear Screw. The thread of the linear screw may have any cross section - for example a circular cross section for increased movement accuracy.
42. Coupling motor connector
43. Anti-backlash element
44. Rail Block
45. Linear Rail that performs linear movement along the first axis as a result of the rotation of the linear screw
46. Rail Block Combiner
40. Step Motor
60. Circle Saw - an example of a cutting element - may not belong to the system
61. Router - another example of a cutting element.
62. The surface of the saw table - an example of an environment of the system Any reference to first movement commands is applicable mutatis mutandis to second movement commands.

Any reference to the first cuttable element is applicable mutatis mutandis to the second cuttable element.

A joint may be formed by (a) forming a first requested pattern of recesses within a first cuttable element (for example—board A), (b) forming a second requested pattern of recesses within a second cuttable element (for example—board B), and (c) connecting the first and second cuttable elements so that they interlock.

There may be provided a system (denoted 1 in FIG. 1) that may include a controller (may be implemented by one or more electrical components such as one or more integrated circuits that execute instructions), and a hold and movement unit.

The hold and movement unit is configured to (a) hold a first cuttable element while the first cuttable element may be being cut by a cutting element during multiple first cut iterations; and (b) execute, under a control of the controller, first movement commands for moving the first cuttable element, along a first axis, between one cut iteration to another to form a first requested pattern of recesses.

During each cut iteration the hold and movement unit is moved (for example by a human operator) along a second axis (may be parallel to the longitudinal axis of rail 17) to provide the first cuttable element to the cutting element, allow the cutting element to form a cut and then remove the first cuttable element from the cuttable element. This may include performing a back-and-forth movement.

The first cuttable element may be held at the same position during the entire formation of the first requested pattern of recesses.

The controller may receive or generate the first movement commands. The first movement commands are generated based on a user request regarding the joint, and one or more cutting element parameters. The system may include a man machine interface for interacting with the user and receive the user request. Alternatively—the system may receive the outcome of the interaction (request) or even the first movement commands from another device.

The user requests may change over time- and different joints can be easily formed by the same system.

The user request may be in a form of an image of the requested pattern.

The hold and movement unit may also be configured to (a) hold a second cuttable element while the second cuttable element may be being cut by the cutting element during multiple second cut iterations, and (b) execute, under a control of the controller, second movement commands for moving the second cuttable element, along the first axis, between one cut iteration to another to form a second requested pattern of recesses.

The controller may receive or generate the second movement commands. The second movement commands are generated based on a user request regarding the joint, and one or more cutting element parameters. The system may include a man machine interface for interacting with the user and receive the user request. Alternatively—the system may receive the outcome of the interaction (request) or even the second movement commands from another device.

The controller may be configured control an execution of the first movement commands based on a progress of a cutting of the first cuttable element. The progress may be represented by a completion of a cut iteration. The progress may be determined based on feedback from the user (using a man machine interface of the system or using another device such as a tablet or a smartphone), the feedback may be sent over a communication link (wired or wireless) and/or based on sensors that sense the completion of the cut iteration.

The system may include a man machine interface that may also be configured to receive an indication of progress of the cutting of the first cuttable element—see, for example forward analog button 30.

The system may include a man machine interface for receiving a request to restart a cut iteration—see for example backboard analog button 31. Such a request may be provided by a user device.

The system may include a man machine interface for receiving a reset request for restarting a to restart a formation of the first requested pattern of recesses—see for example reset analog button 32. Such a request may be provided by a user device.

The user request regarding the joint may defined at least one out of (a) one or more spacings between recesses, (b) widths of one or more recesses of the first requested pattern of recesses, (c) one or more shapes of one or more recesses of the first requested pattern of recesses, (d) type of joint, and the like.

The interaction between the user and the system start with the index screen FID 11A, the user can select between 2 options: (a) Calibration (b) Select cut plan Calibration different options screen are illustrated in (a) FIG. 8A method 220 and FIG. 10B screen 420 referred to examples of circuit saw selection, (b) screen 422 of FIG. 10D referred to examples of Dovetail bit selection (or other device). A calibration may include displaying to the user one or more images/screens (and/or using voice based communication) in which the user may perform at least one out of (a) select, by the user, of a cutting element type (for example circuit saw, dovetail, any other type), (b) at least one cutting element dimension (for example width), (c) movement unit millimeter of inch (d) pressure between the first and second cuttable elements once assembled to form a joint. Moving the scroll bar to the right, indicate on the screen a positive number, Moving the scroll bar to the left indicate on the screen a negative number. Positive number cause to the joint part to be tight Negative number indicate on referred to loosen between the joint parts Save parameters is needed after the user entered the saw parameter and the Intensity Pressure Between Parts, The machine needs to know the zero passion of the cutting material against the cutting tool FIG. 3 (24)

Figure 10A:
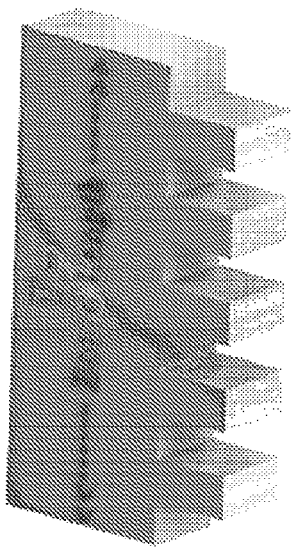
Figure 10A:
Figure 10B:
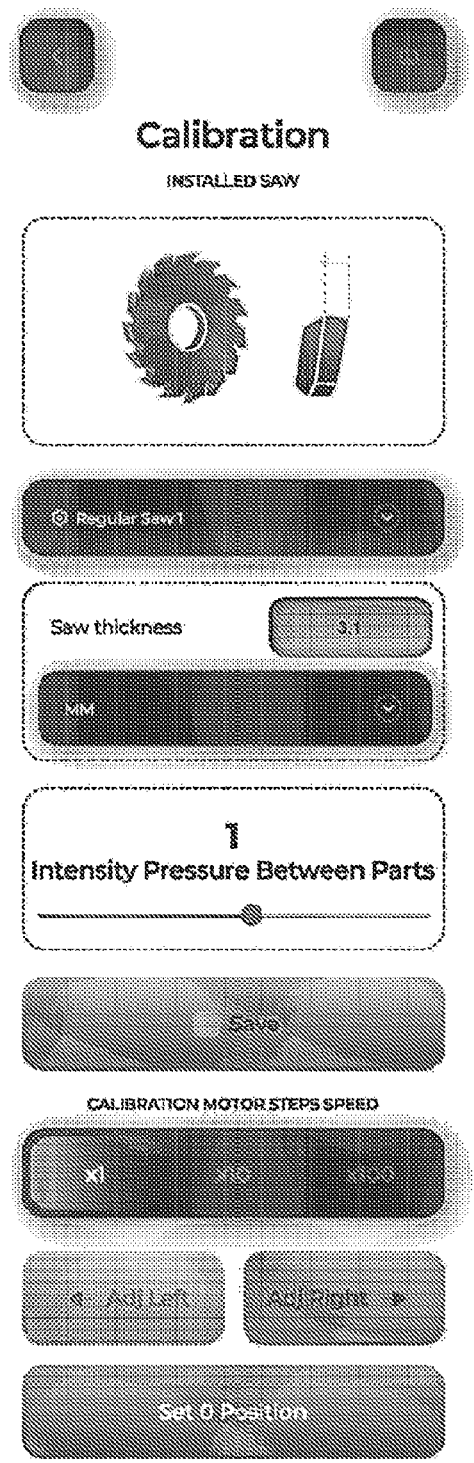

The User can select 3 movement steps—see FIG. 10B screen 420, ×1 ×10 and ×100 buttons. Those controllers determine the distance the cutting material FIG. 3 (18) is moving against the cutting tool FIG. 3 (24)

Figure 3:
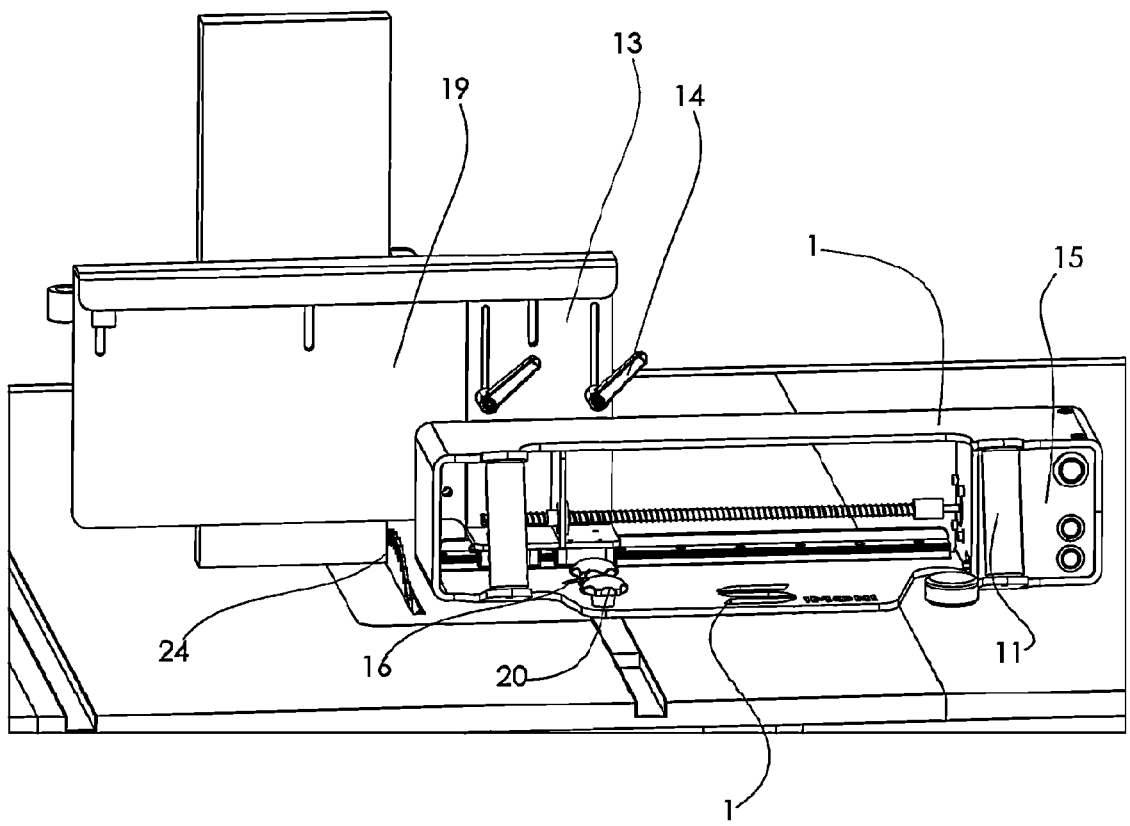
Figure 4:
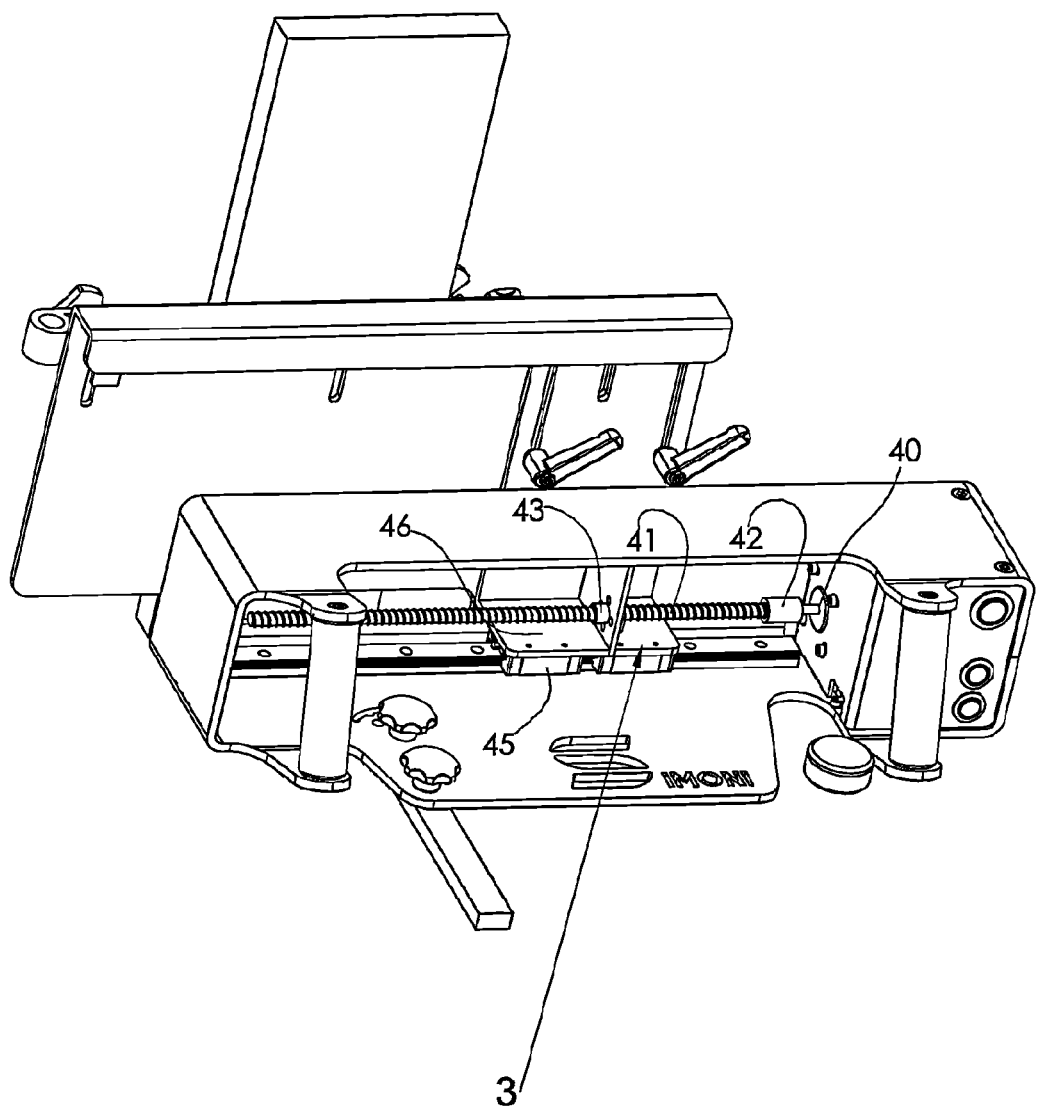
Figure 5:
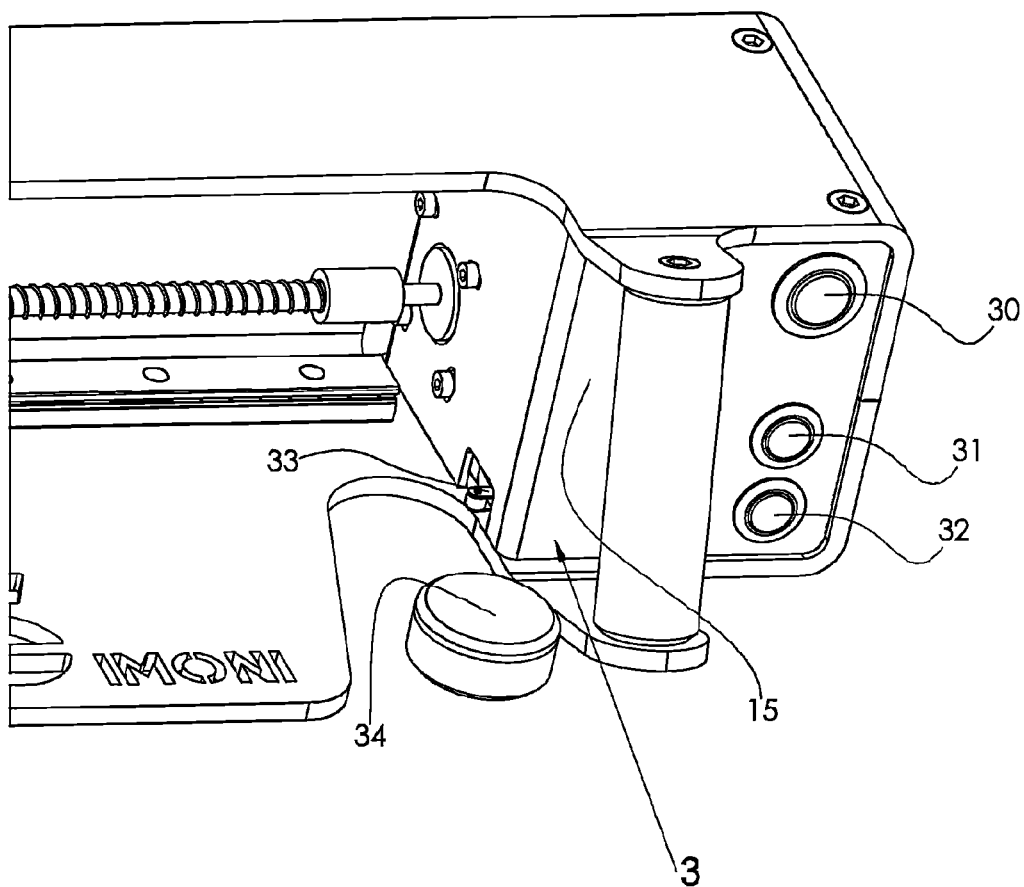
Figure 10C:
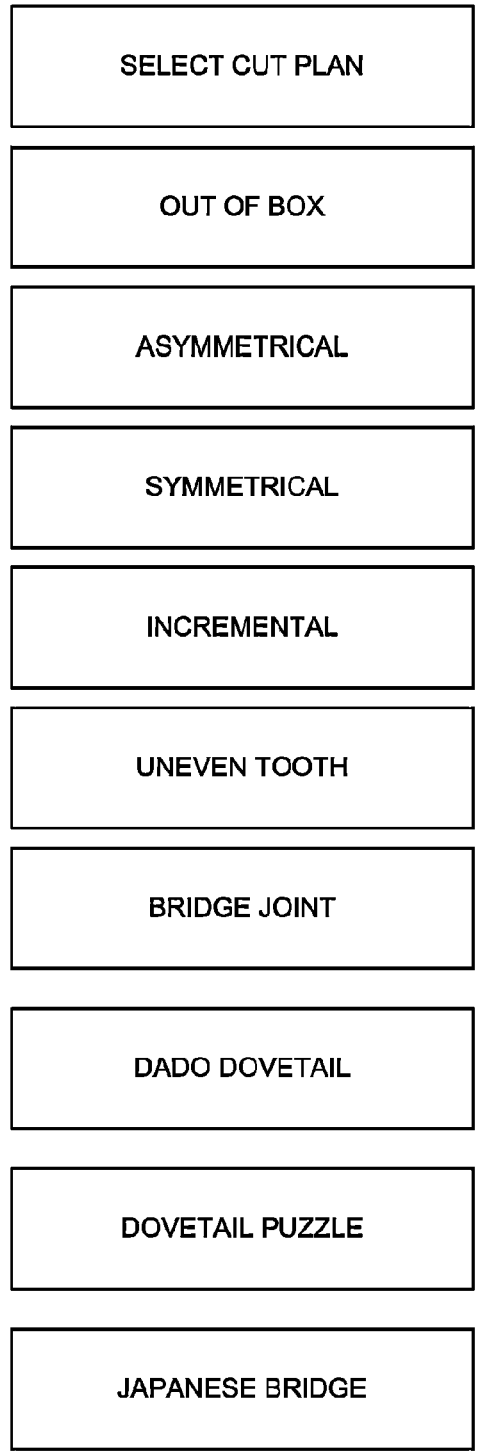
Figure 10D:
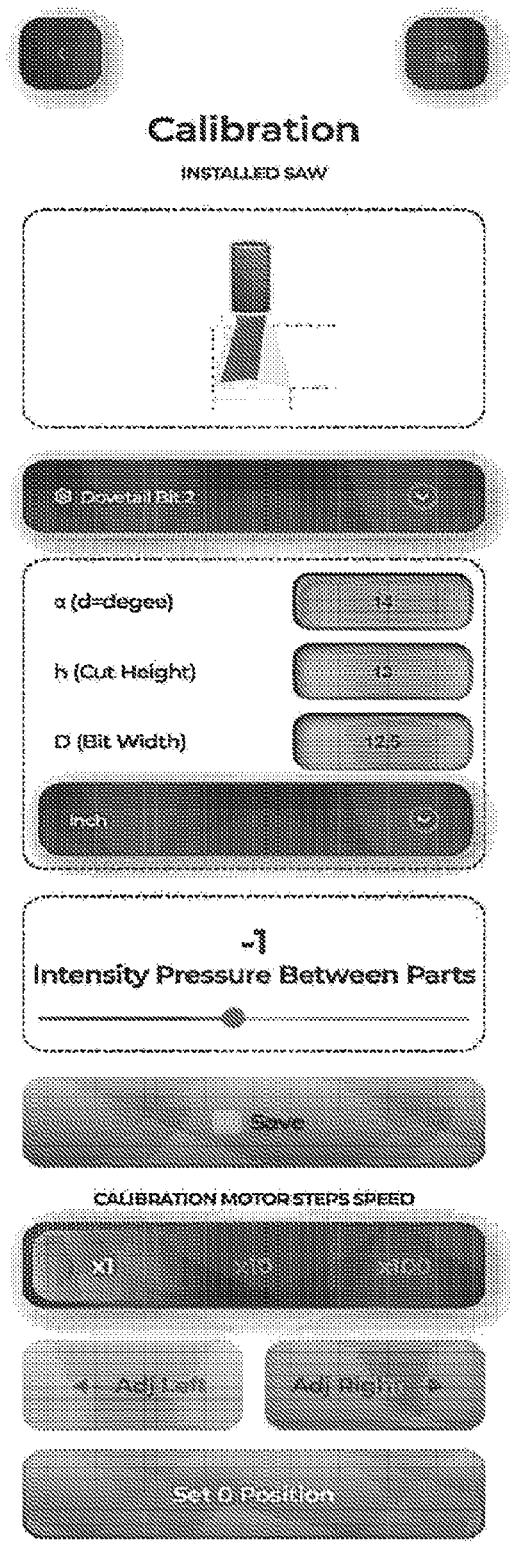

When the user determine the distance between the cutting material FIG. 3 (18) and the cutting tool FIG. 3 (24) is zero, push on the 'SET ZERO POSITION' button FIG. 10B and FIG. 10D is need in favour to mark the zero position start point In FIGS. 1-8 the hold and movement unit includes (at least) main chassis 10, technical grip handles 11, adjustable material holder plate 13, leading rail 17, material holding plate 19, step motor 40, linear screw 41, and anti-backlash element 43.

The hold and movement unit may include a motor (such as step motor 40), a screw (such as linear screw 41) rotatable by the motor, a first interface (may include or may be connected to anti-backlash element 43) that may be movable along the screw upon a rotation of the screw, and a holder (may include material holding plate 19 and arms 19').

The first interface may be mechanically coupled to the holder.

The system may include one or more height adjustment elements (see—for example fix plate 13, ratchets 14) for adjusting a relative height between the holder and the first interface.

The hold and movement unit may include a holder and one or more roll angle height adjustment elements (see for example third and fourth knobs 26 and 27) for adjusting a roll angle of the holder. The knobs may be used to manually set the roll angle. It should be noted that the roll angle may be set using a motorized mechanism that may be controlled to set the roll angle.

Figure 6:
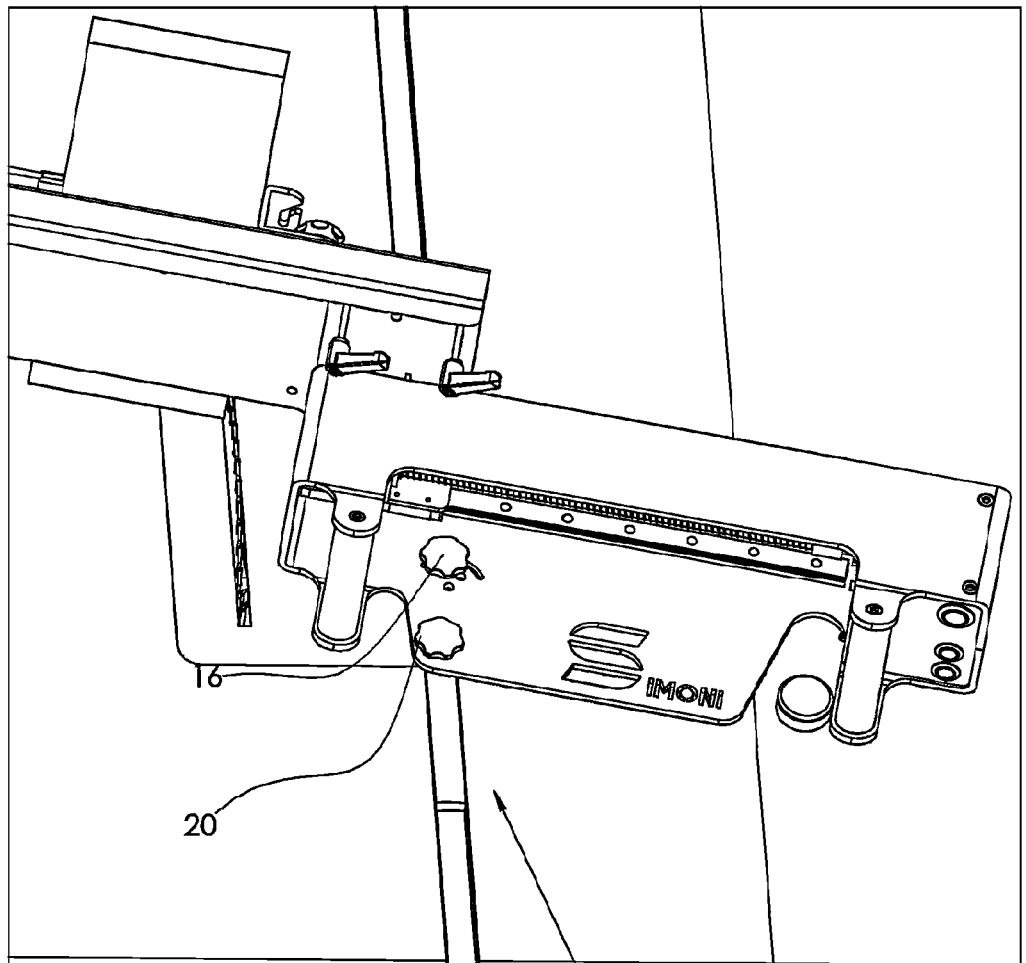
Figure 7:
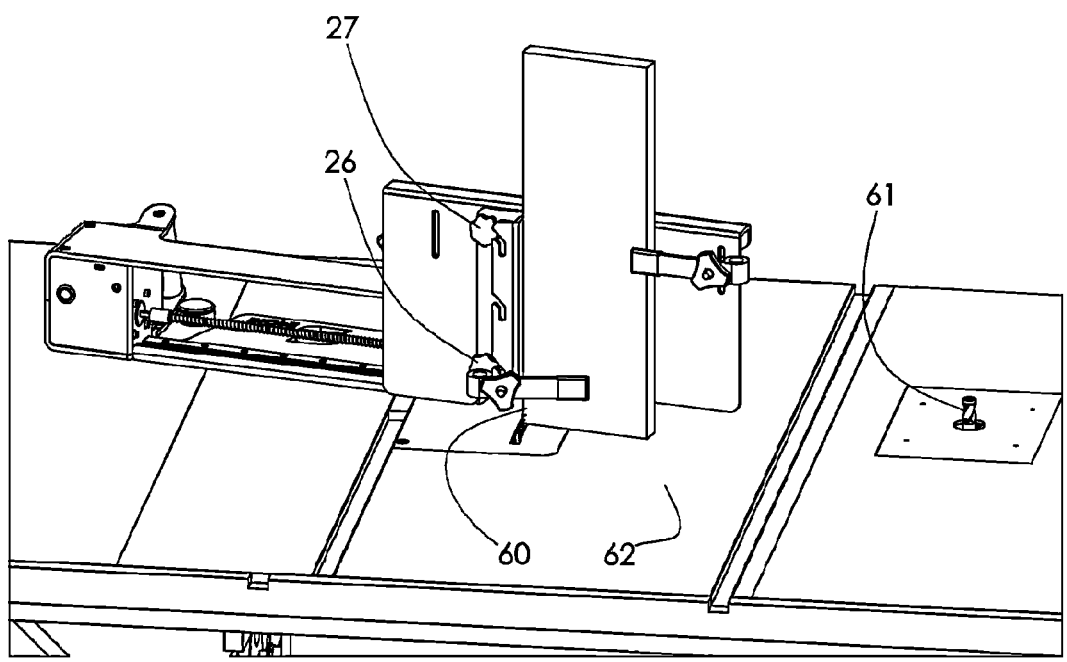

The hold and movement unit may include one or more yaw angle adjustment elements (see for example first and second knobs 16 and 20) for adjusting a yaw angle of the system. The knobs may be used to manually set the yaw angle. It should be noted that the yaw angle may be set using a motorized mechanism that may be controlled to set the roll angle. It should be noted that FIG. 3 illustrates a yaw angle of zero—the rail is normal to the first axis and the cut element approaches the saw at a ninety degrees angle. It should be noted that FIG. 6 illustrates a non-zero yaw angle—the rail is not normal to the first axis and the cut element approaches the saw at an angle that differs from ninety degrees.

The EJAS can create pins of the dovetail by a circular saw only without the need for a special gnawing angle cutting tool such as router dovetail bit in the following way: set the degrees of FIG. 6 (16) to 7° degrees to create cutting rerio a ratio of 1:8

Change the EJAS angle to the opposite angle from the other side and cut the complementary angle The table below show the common cutting ratio for dovetail shape and there angle, the EJAS can set those cutting angle by human hand moving or by electronic servo motor that automatically set the angle according to the desired angle cutting shape

| Slope ratio | Angle in Degrees |
| --- | --- |
| 1:4 | 14.04° |
| 1:5 | 11.31° |
| 1:6 | 9.46° |
| 1:7 | 8.13° |
| 1:8 | 7.13° |

The EJAS can create any cutting Engle between 0° to 180, 90° for each side

The hold and movement unit may include a main chassis, user handles, and a cutting element environment interface (see for example rail 17) that interfaces between the system and an environment of the cutting element.

The system may include a safety mechanism for preventing a start of movement of the holding and movement unit towards the cutting element until there may be at least a predefined distance between the first cuttable element and the cutting element. See for example microswitch 33 and magnet microswitch pusher 34. Any other safety mechanism may be used—for example the safety mechanism may include an image sensor, a beacon (for example laser beacon) and beacon sensor, and the like.

The system may also bypass the safety mechanism or may be provided without safety mechanism.

The system may be used for forming openings in a cut sample. The distances between the openings and the sized and shapes of the openings may be determined in the same manner that any of the mentioned above patterns are set.

FIGS. 8A-8D, 9A-9F, 10A-10E and 11A-11D illustrates various processes and/or screen shots for interaction between a user and the system or between a user and a user device (or any other devices that differs from the system of FIGS. 1-8).

The interactions cause the user to determine a user request that is converted to very accurate movement micro steps commands from 1 mm to 0.001 mm (accuracy can controlled by the system) executed by the system. The interaction may also provide information about the cutting element. The interactions also may start and/or execute processes such as cutting the cut element, and/or calibration. The calibration may include alignment and/or adjusting yaw and/or roll angles and/or providing the information about information about the cutting element).

Figure 8:
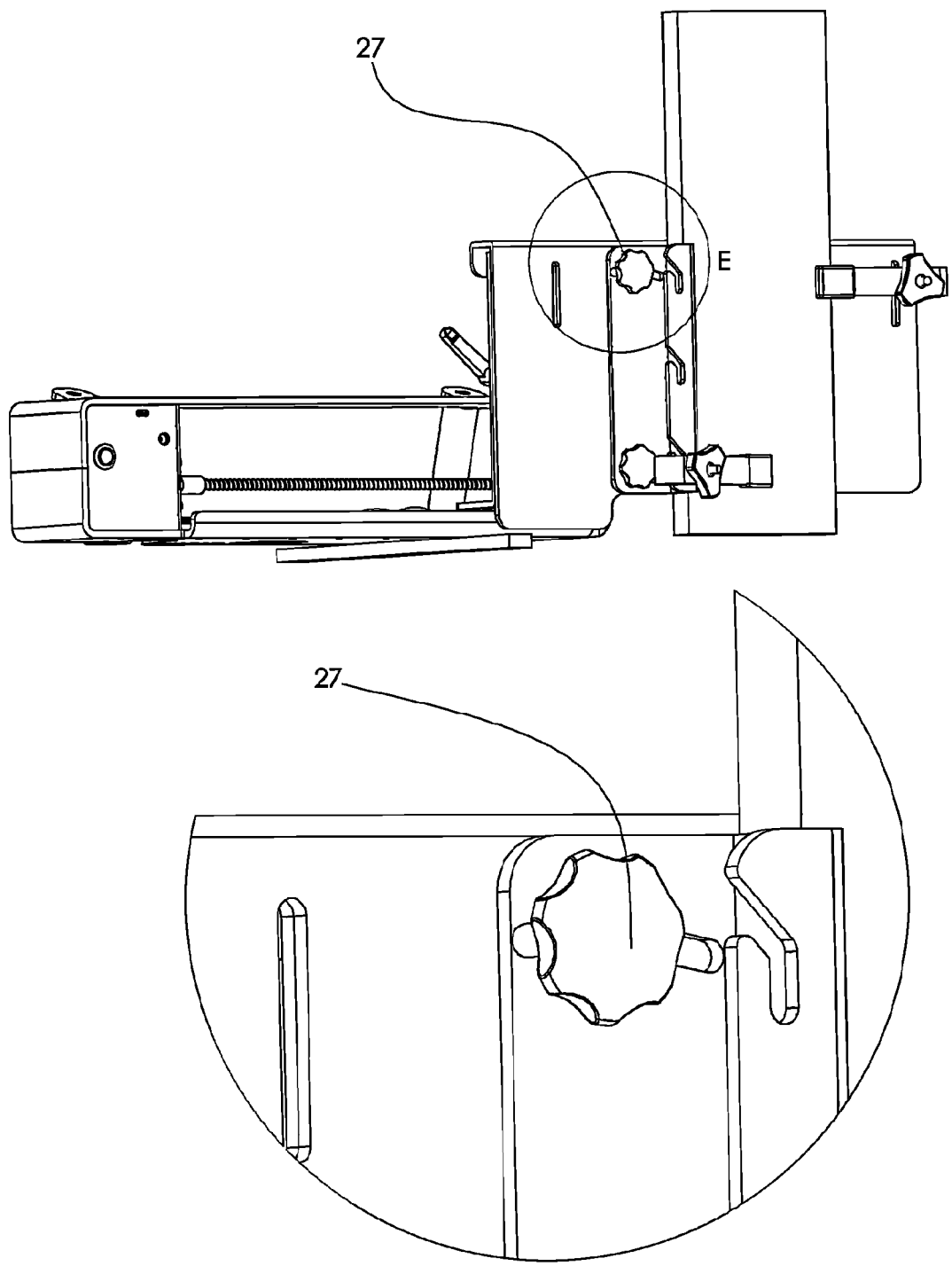
Figure 8A:
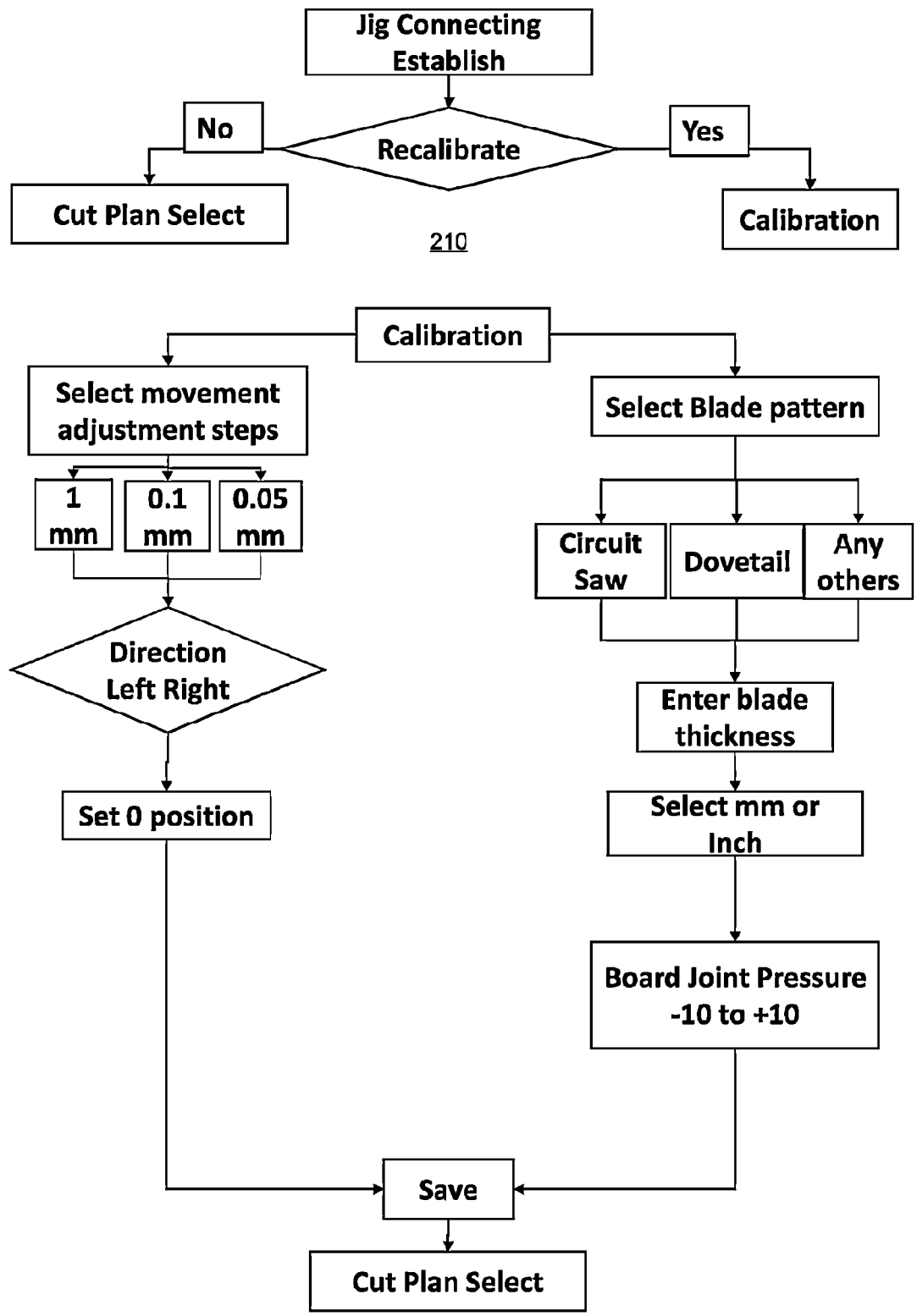
FIGS. 8A-8D, 9A-9F, 10A-10E and 11A-11D illustrates various processes and/or screen shots for interaction between a user and the system or between a user and a user device.

FIG. 8A illustrates a method 210 that includes determining whether to recalibrate—and what is done when recalibration is required or not.

FIG. 8A also illustrates a method 220 for calibration. It includes selecting a blade pattern (for example circuit was, dovetail or any other), entering blade thickness, selecting mm or inches, and determining pressure—board joint pressure. It may also include selecting movement adjustment steps (for example 1, 0.1 or 00.5 mm), set yaw steps movement (left or right) to calibrate the zero position and set zero position.

Figure 8B:
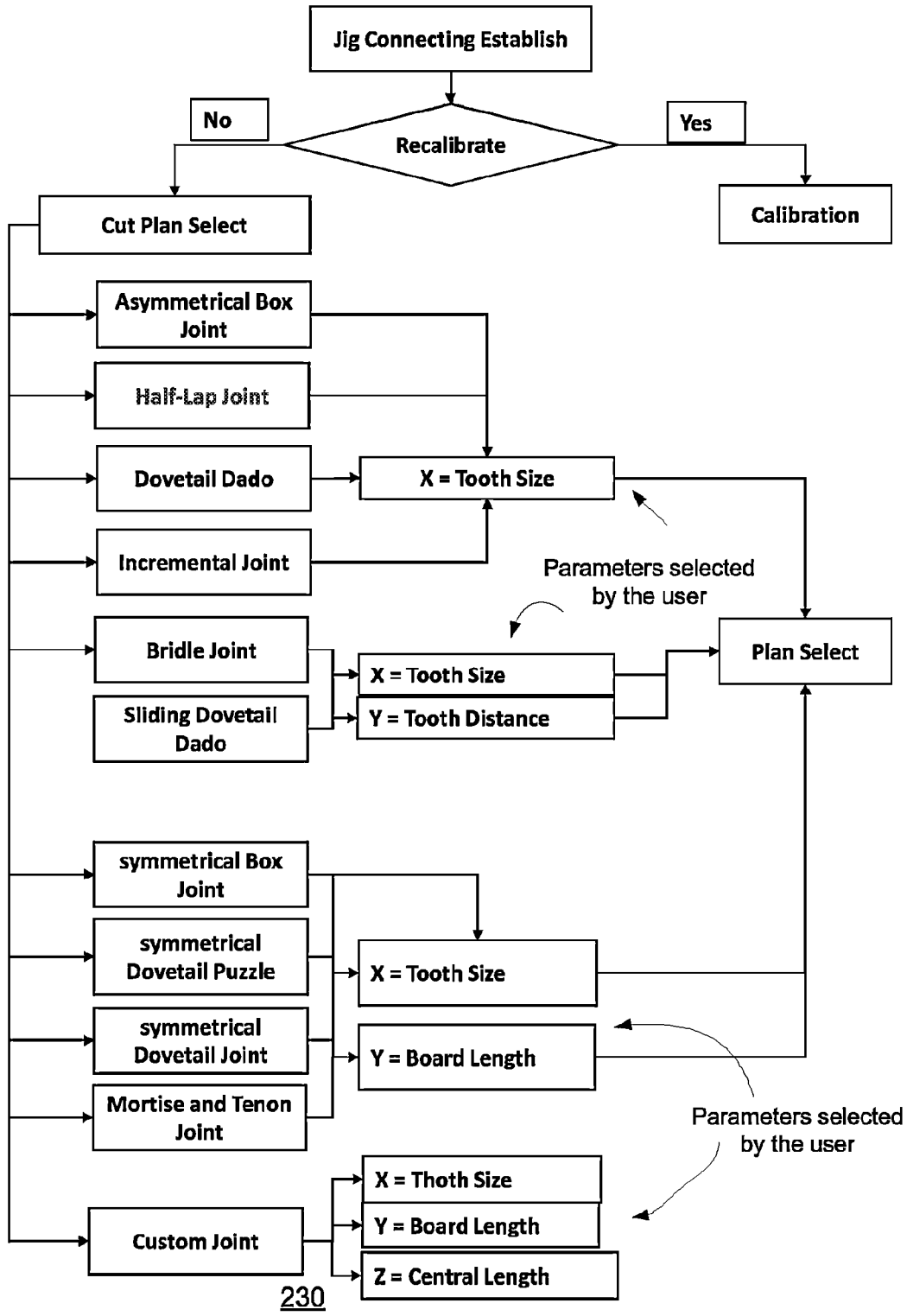

FIG. 8B illustrates a method 230 that includes example of possible but not only selecting of cut plans (may regarded as a user request regarding the joint. The method maps the selected type of joint to the one or more parameters that the user has to feed.

Further examples are provided in the following table:

| Plan Name | User Information need to provide Per Plan | | | Number Of Input User Parameter Per Plan |
| --- | --- | --- | --- | --- |
| | X = Desired Tooth Length | Y = Desired Board Length | Z = Desired Central Length | |
| Out Of the Box (FIG. 9D) | | | | 0 |
| Asymmetrical Box Joint | ✓ | | | 1 |
| Half-Lap Joint | ✓ | | | 1 |
| Dovetail Lap Joint | ✓ | | | 1 |
| Dovetail Dado | ✓ | | | 1 |
| Incremental Joint (FIG. 9B) | ✓ | | | 1 |
| Bridle Joint | ✓ | ✓ | | 2 |
| Japanize Joint (FIG. 9C) | ✓ | ✓ | | 2 |
| symmetrical Box Joint (FIG. 9F) | ✓ | ✓ | | 2 |
| Symmetrical Dovetail Puzzle (FIG. 9E) | ✓ | ✓ | | 2 |
| symmetrical Dovetail Joint (method 317) | ✓ | ✓ | | 2 |
| Custom Joint (FIG. 9A) | ✓ | ✓ | ✓ | 3 |

Figure 8C:
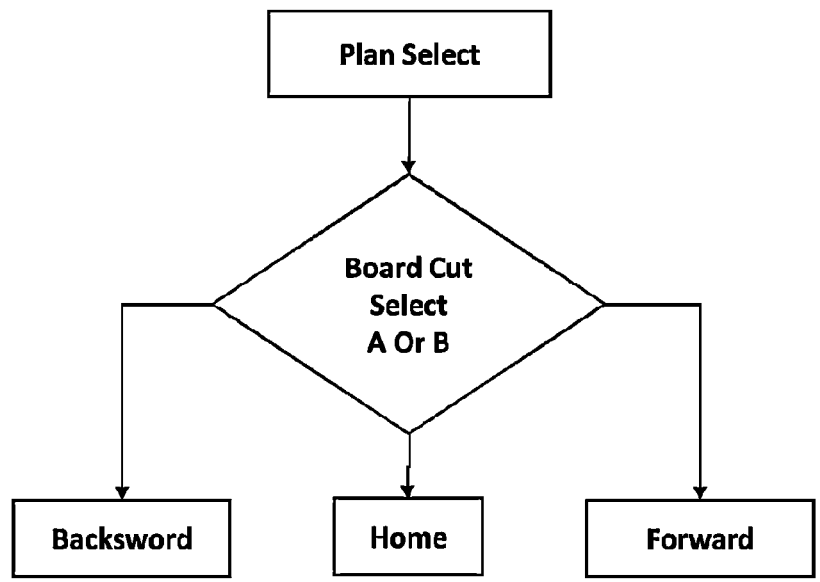

FIG. 8C illustrates a method 240 that includes starting the cutting—selecting whether the first or second board are being cut (A or B) and then providing an indication of starting the cutting process, completing a cut iteration or requesting to restart a cut iteration.

Figure 8D:
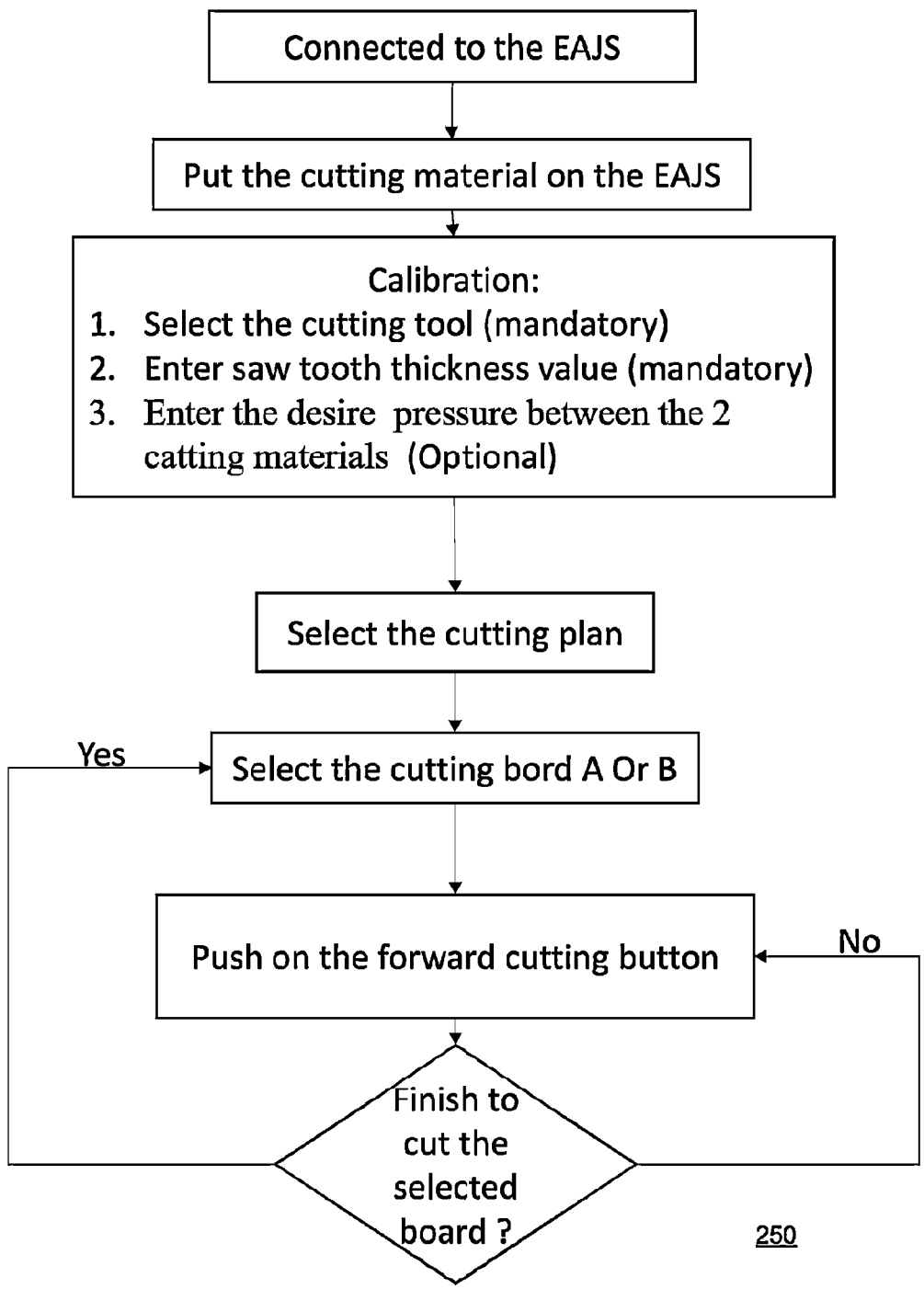

FIG. 8D illustrates a method 250 that illustrate cutting process includes placing the cut material, calibration (for example if this is the first time)—the calibration may include selecting the cut tool, enter cutting element parameter—such as thickness of saw, and having an option to select the pressure between the two cat elements), select a cutting plan, select board A or B, and cutting. A cut iteration may involve pushing the forward cutting option. The process may end when reaching the end of the selected board.

FIGS. 9A-9F provide screens that show a requested joint and the requested parameters to be set by the user.

Figure 9A:
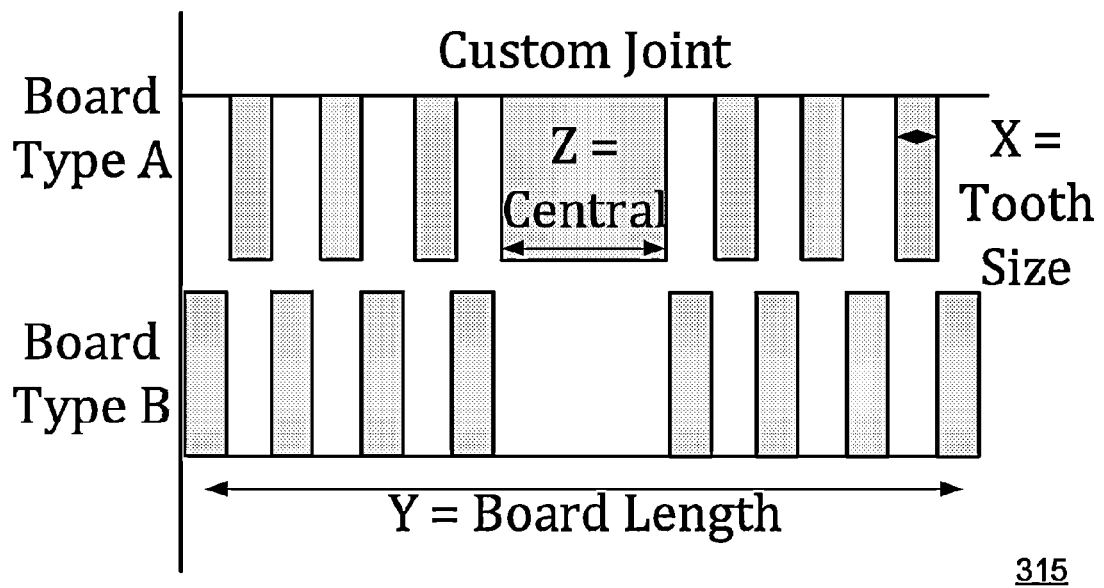
Figure 9A:
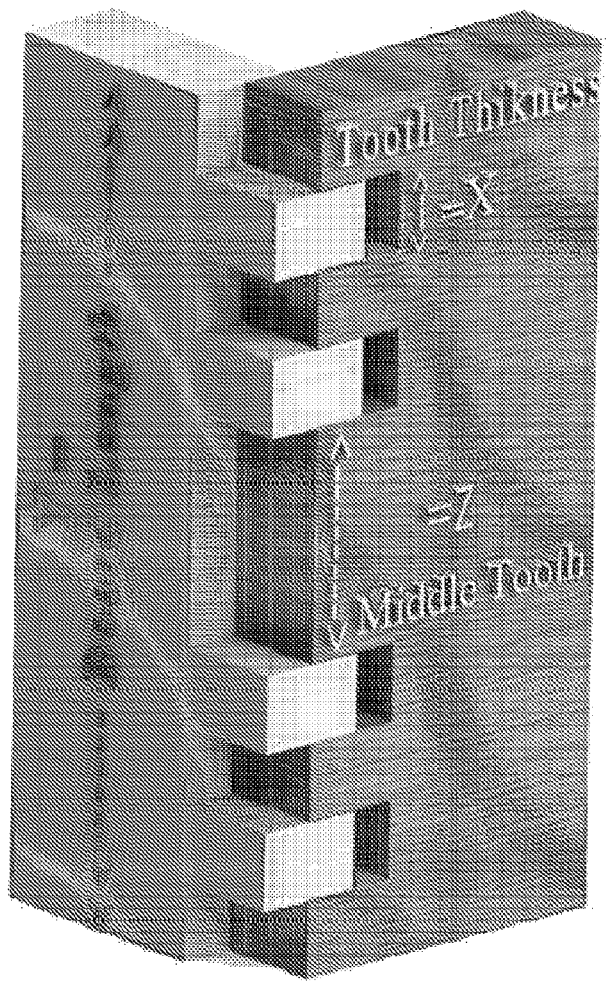

FIG. 9A illustrates an uneven joint (with a wider middle tooth) 310 and the relevant parameters (illustrated in sketch 315) to be fed by the user.

Figure 9B:
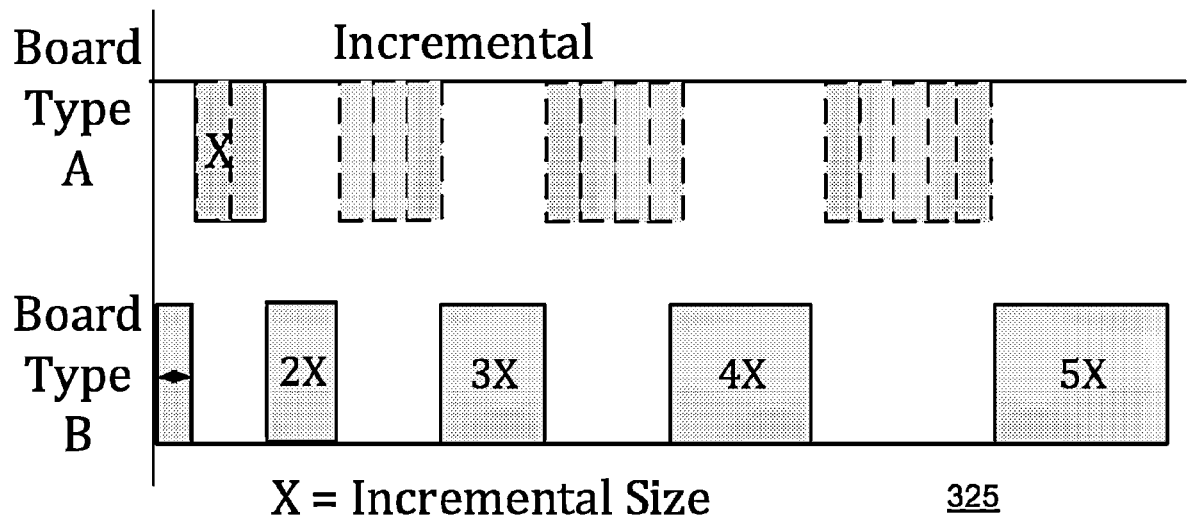
Figure 9B:
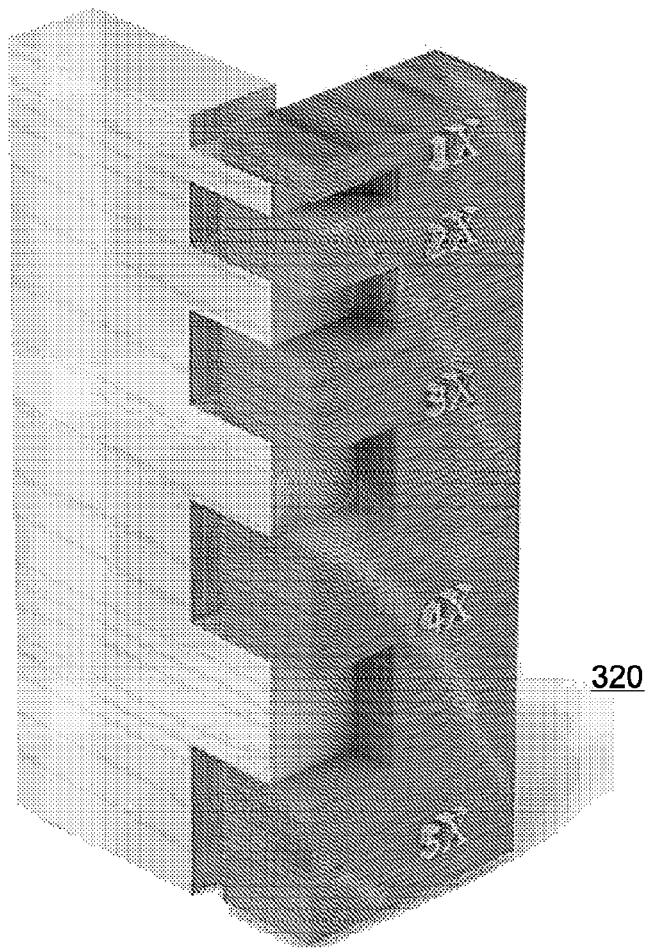

FIG. 9B illustrates an incremental joint (spacing between adjacent recessed incrementally increase) 320 and the relevant parameters (illustrated in sketch 325) to be fed by the user.

Figure 9C:
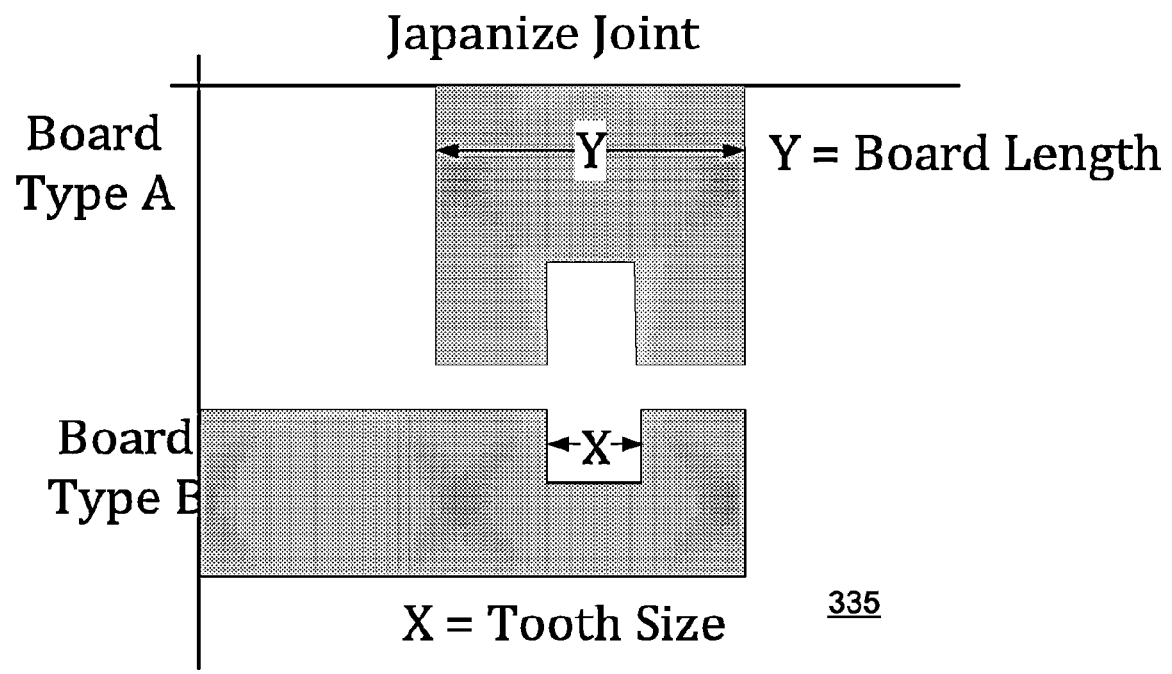
Figure 9C:
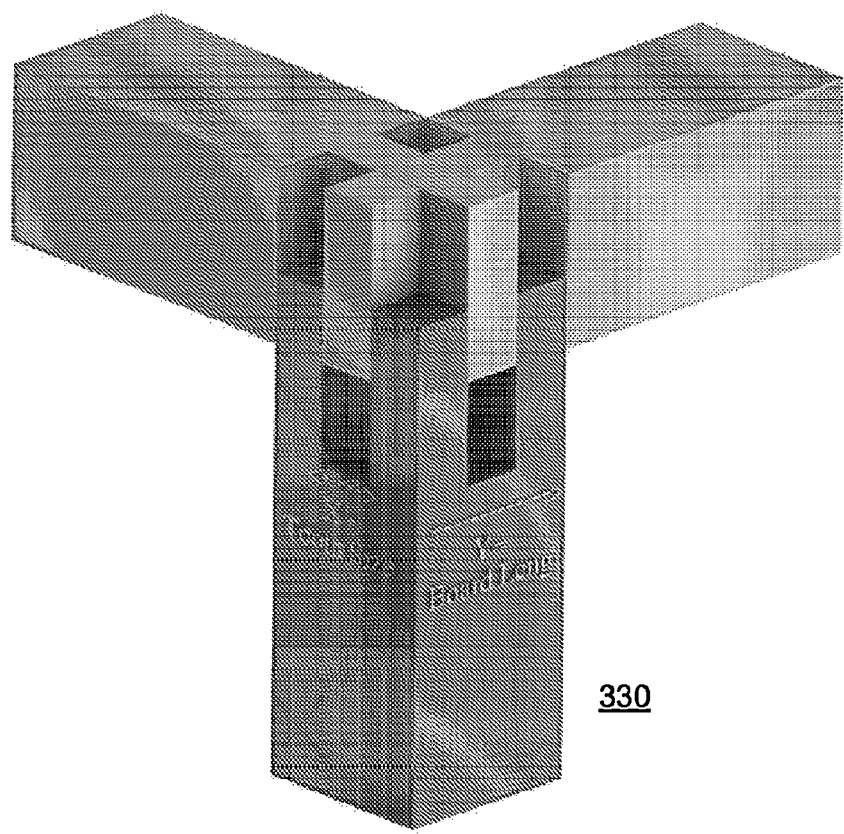

FIG. 9C illustrates a Japanese joint 330 and the relevant parameters (illustrated in sketch 335) to be fed by the user.

Figure 9D:
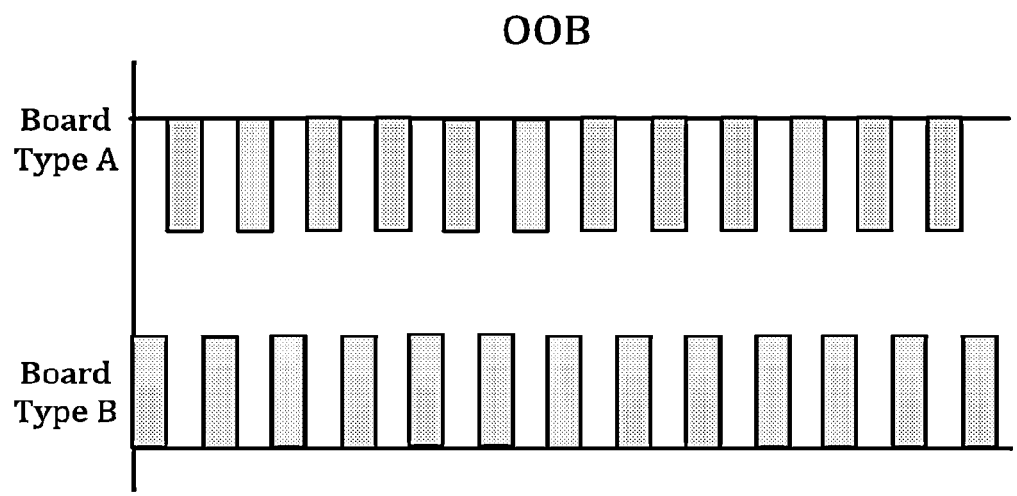
Figure 9D:
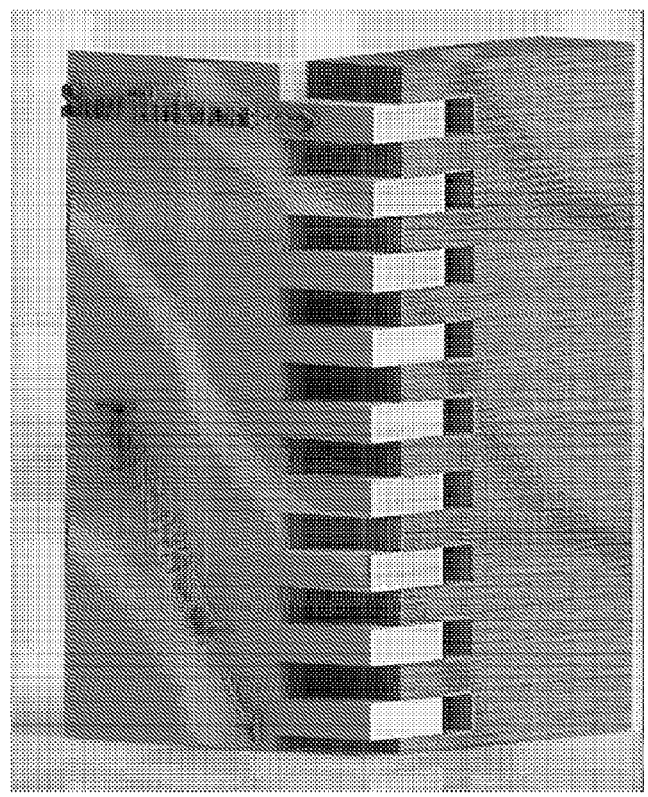

FIG. 9D illustrates an out of box (OOB) joint 311 and the relevant parameters (illustrated in sketch 316) the user in this example does not need to enter any value. The EJAS may be used with the calibration information only.

Figure 9E:
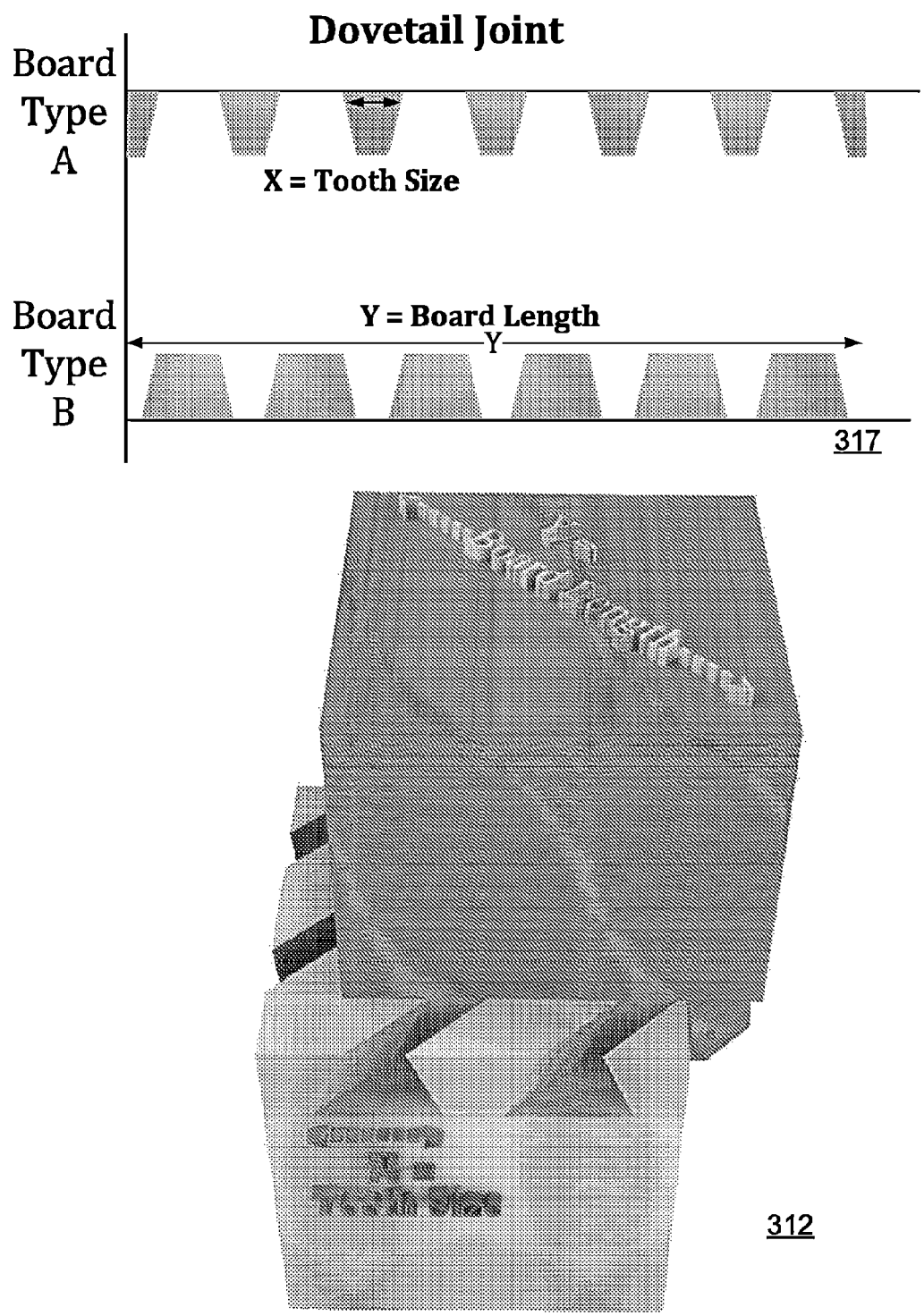

FIG. 9E illustrates a dovetail joint 312 and the relevant parameters (illustrated in sketch 317). The tooth size (X) and the board length (Y) may be provided.

Figure 9F:
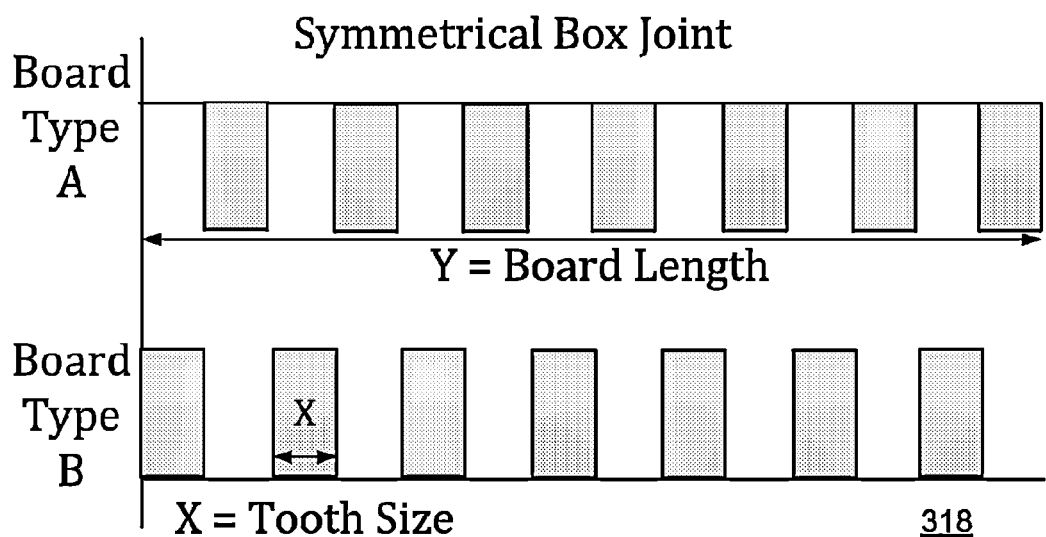
Figure 9F:
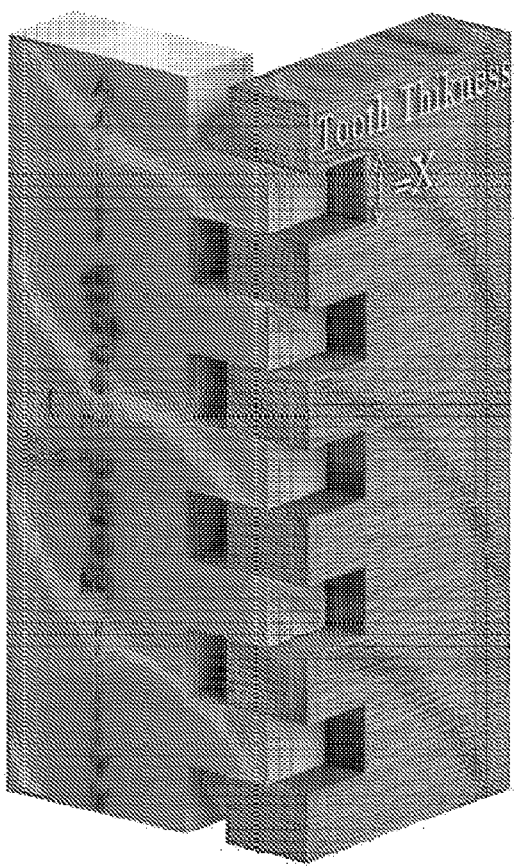

FIG. 9F illustrates a symmetrical joint 313 and the relevant parameters (illustrated in sketch 318). The tooth size (X) and the board length (Y) may be provided.

Such screens may be provided for any type of joint. The sketches may or may not be displayed.

Figure 10E:
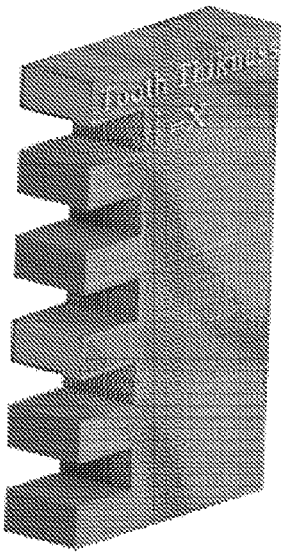
Figure 10E:
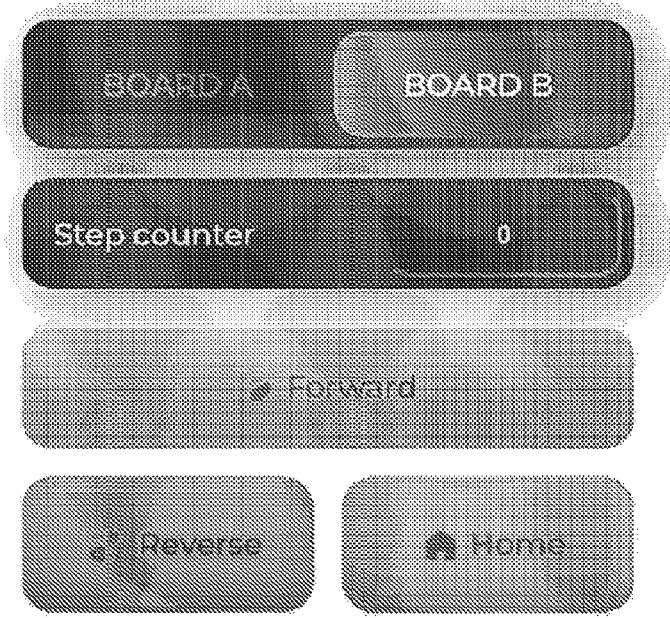
Figure 11A:
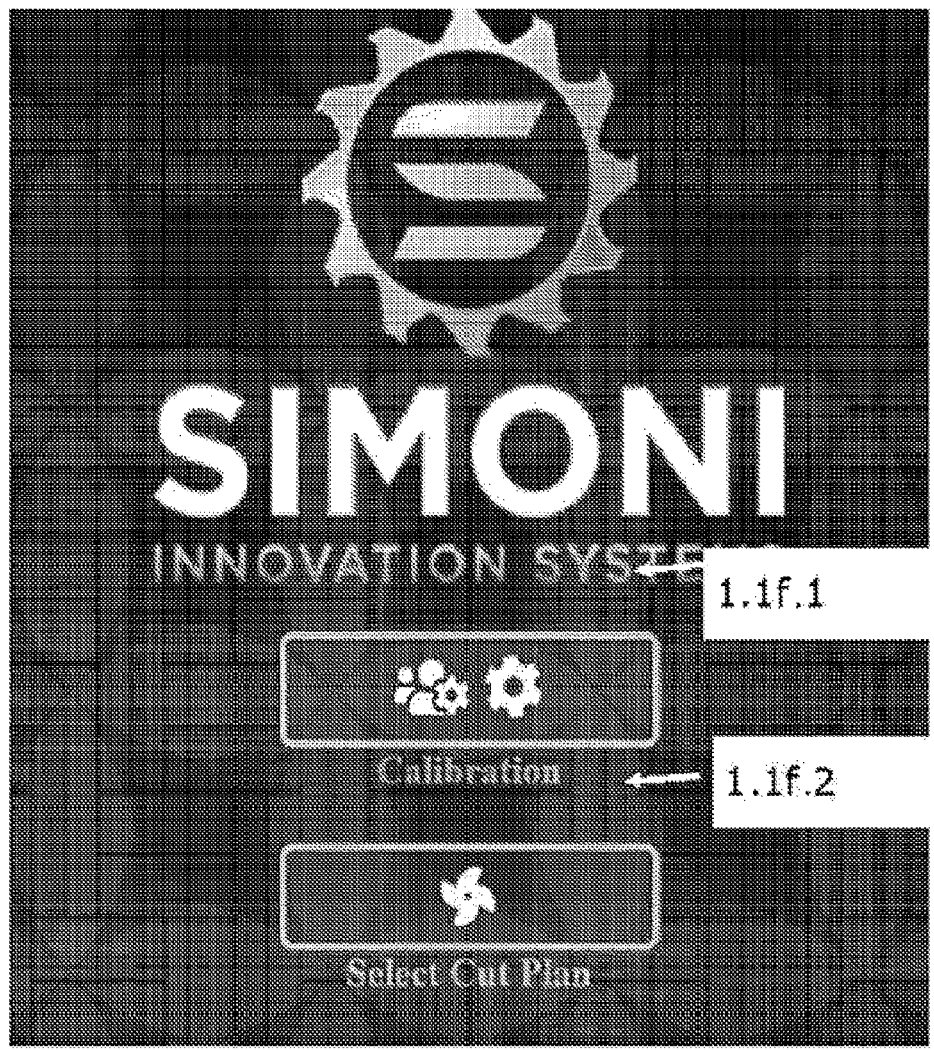
Figure 11B:
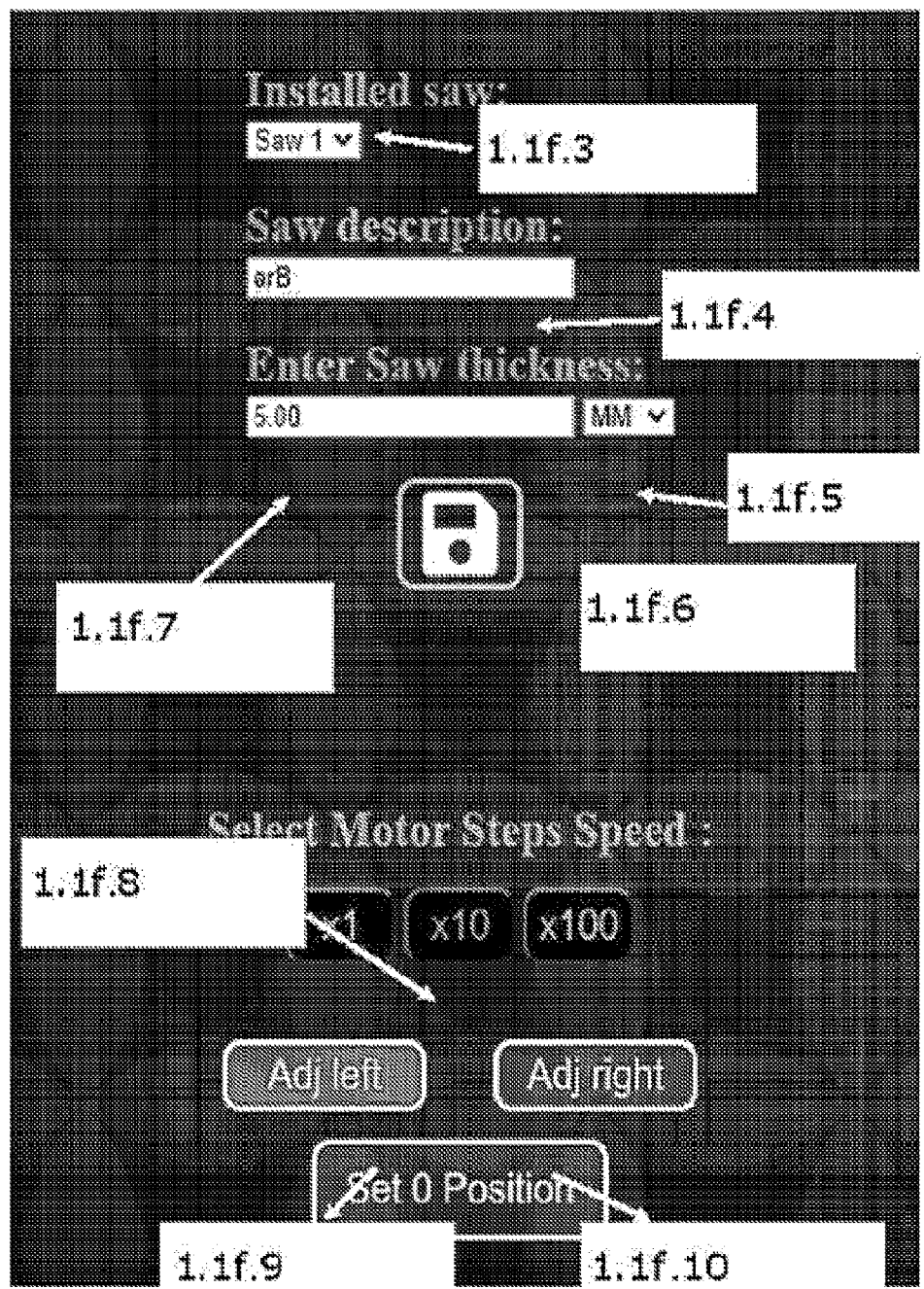
Figure 11C:
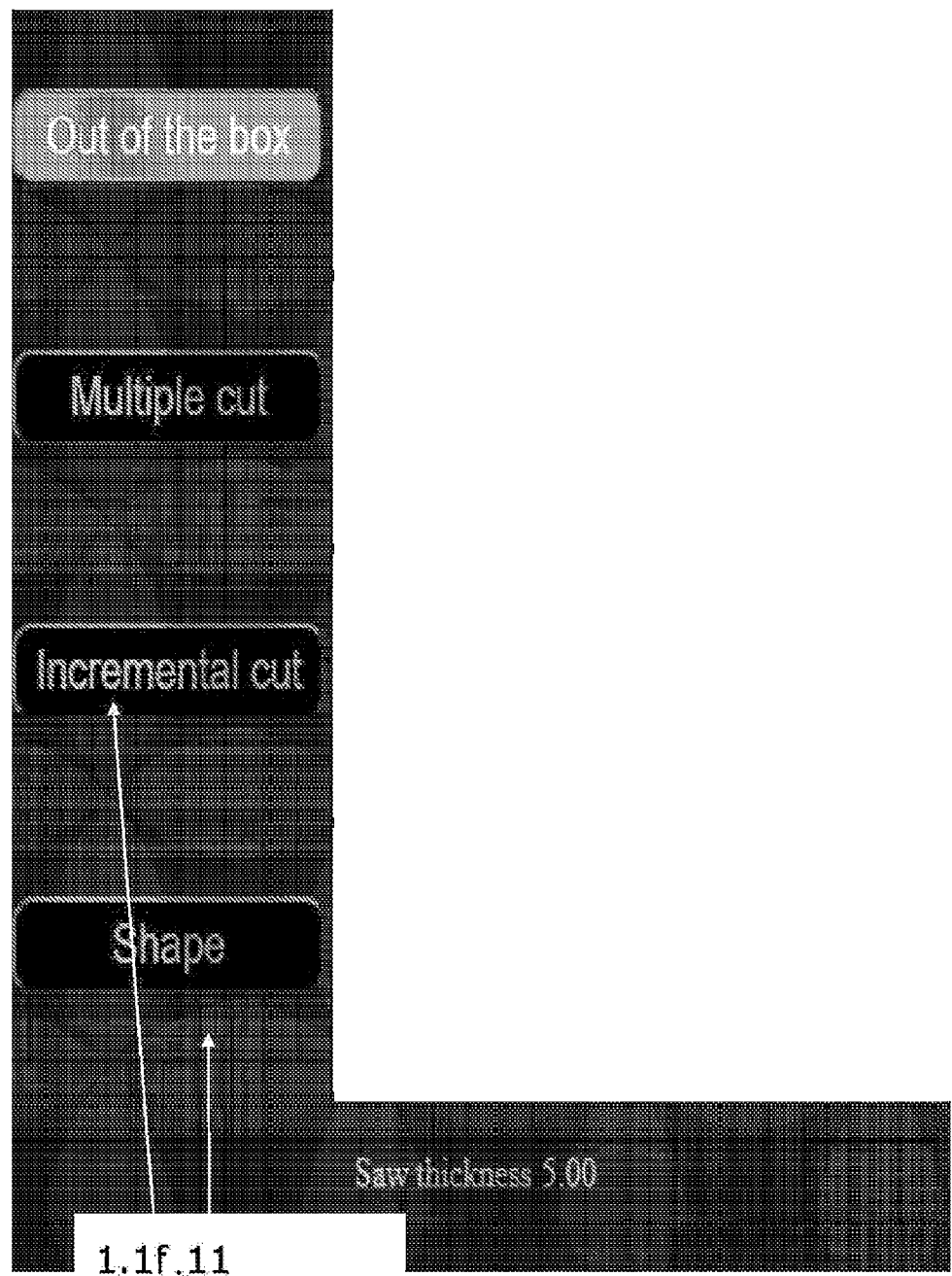
Figure 11D:
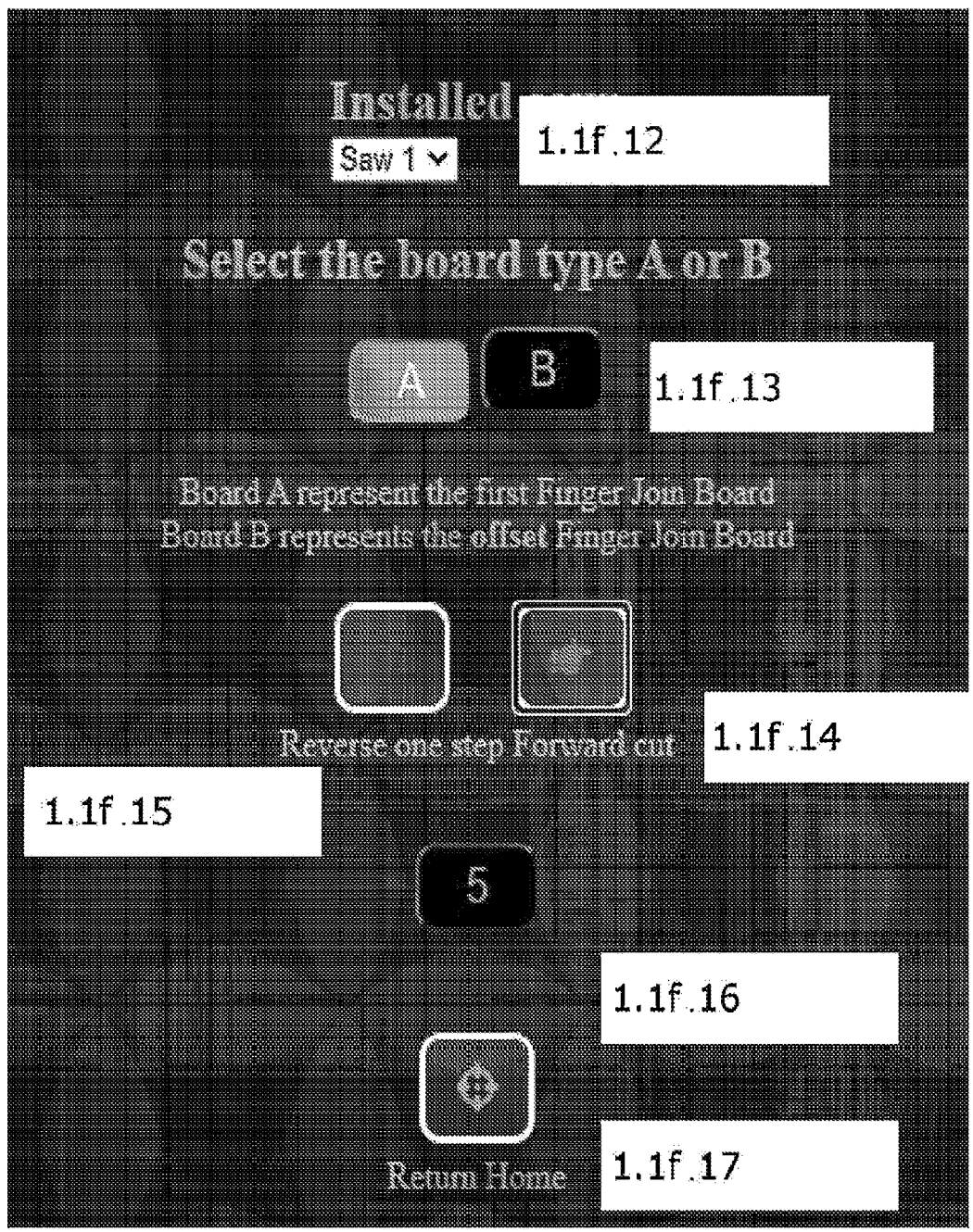

FIG. 10A illustrates a screen 410 in which a certain joint has been selected, the user indicates that the cut element is the first element (A) of the joint, may update a step count (cut iteration counter), may provide feedback about a completion of a cut iteration, request to reverse or reset. The screen displayed when selecting the second cut element (B) of the joint is shown in FIG. 10E.

FIG. 10B illustrates a calibration screen 420 in which the type of cutting element (for example regular saw) is provided, the thickness of the saw is provided, the pressure intensity between the two cut elements (once assembled to for the joint) is set (for example by moving a knob), the user may save his inputted information, the motor speed step is set how much movement to move the cutting material to the zero point—the motor speed step can be of different values—higher value may reduce the time required to get to the zero point and a lower value may allow in reaching the zero point mode accurately. Larger distance to reach the zero point (wider cut elements) may lead to a selection of a higher motor speed step. Example of motor speed steps may include ¼₀₀, ¼₀, ¼ millimetre, and the like. The roll angle is set, by selecting the left adjustment button or right adjustment button, and zero set position (alignment) is started.

FIG. 10C illustrates a set of screens—for selecting which cut plan to select—each cut plane may be displayed on a different screen and may show an image of the joint and may open windows for receiving relevant parameters regarding the selected type of joint. Example of the user input parameter introduce on the table above FIG. 10C illustrated certain types of joints—other types may be provided. Any interaction with the user may be provided—for example the method does not necessarily need to display an image of a joint.

FIG. 10D illustrates a calibration screen 420 in which the type of cutting element (for example dovetail cutter) is provided, the maximal diameter of cutting (D), the height of the cutting element (h) and the difference (d) between the radiuses of the top and bottom of the cutting element are provided, another type of information can be provide to type of cutting element such as cutting tool angle and cutting ratio, the pressure intensity between the two cut elements (once assembled to for the joint) is set (for example by moving a sliding bar), the motor speed step is set how much movement to move the cutting material to the zero point, by selecting the left adjustment button or right adjustment button, and zero set position (alignment) is started.

FIG. 10B illustrates a calibration screen 420 and FIG. 10D illustrates a calibration screen 422 are the same calibration screen, showing different calibration selections of the cutting tool element FIGS. 11A-11D are example of screens 510, 520, 530 and 540 that may be displayed to a user. Some of the screens show the same functionality but in different design style.

The following example illustrates a process (forming an out of box joint) in which these screens are shown—at least some of the screens are optional:
a. Enter to the application page. And select to recalibration the system or directly select the desired cut plan 210 and 240
b. Enter to the calibration page FIG. 11A (1.1f.2)
Inside the calibration page FIG. 11B 520
c. May select the configuration saw (1.1f.3).
d. May add a description of the saw (1.1f.4).
e. Enter the cutting tool parameters (1.1f.7)
f. For Circle saw enter only the saw tooth thickness
g. For dovetail route bit enter the high, D and d
h. Select the unit of measurement (1.1f.5) (inch or millimetre)
i. Save the parameter (1.1f.6).
j. Start a calibration to zero point position:
i. Move the cut material to touch the edge of the cutting element FIG. 3 (24)—for example by pressing on adjust right-left buttons.
ii. Select the steps adjustment x1 x10 or x100 (1.1f.8).
iii. Push the home button (1.1f.10) to zeroing the steps position
k. Select the 'cut plan' (1.1f.2) button FIG. 11D 540
l. Move to the 'start to cut page' and select one of the different plans according to required joint selection (1.1f.11)
m. Select the first cut board is A (1.1f.13)
n. Start to move the material selection forward (along the second axis) by pushing the EAJS forward (1.1f.14)
o. You can return back (1.1f.15) the same amount of movement you preformed forward
p. Counter of movement (1.1f.16)
q. Home position button returns the cut element to the start point (1.1f.17) FIG. 3 (24)
r. Release the cut element A, and replace to cut element B (1.1f.12)
(Return the process for cut element B)

Yet another example for forming a joint, assuming that the cutting element is a saw and that it is mounted on a table that has a recess (placeholder) for the leading rail.

Every table saw has a placeholder for the lading rail (17).

The EAJS can fit also to router table or for any cutting tool with lading rail

The following steps illustrate how to cut
a. Put the EAJS with the help of the leading rail. (17)
b. Place the cut material (18) on the cutting holding plate (19) against a cutting element (60) or (61) in that way that the edge of the cut element is touching the side of the cutting element. (24)
c. Complete the calibration.
d. Select the desired plan and enter the relevant parameters requested by the application. Most of the time it will be 1-3 simple parameter—230
e. To start the cut process, the user needs to start and power on the cutting element. (60) or (61)
f. Push the forward button (application) 240 or an analog button (30).
g. The application and/or the system will calculate the movement distance for each tooth. (15)
h. Push forward the EAJS through the cutting element and pull back the machine (10) with the help of (11) after the first hole.
i. A second movement of the step motor can be enabled only after the material is out of the cutting element (can be controlled by a safe mechanism (33) and (34)).
j. The user pushes forward on the app or pushes the analog button (30) as described above and vice versa.
k. The result of the repetition of pushing on the forward button, pushing the jig forward against the cutting tool and pull it back causes the creation of the joint A board.
l. To cut the complementary board, the user needs to put a new cut element and select B type board on the application. 412
m. When finishing the job the user can push on the home button 410 or 420 to be ready to select the next cutting plan.

Figure 12:
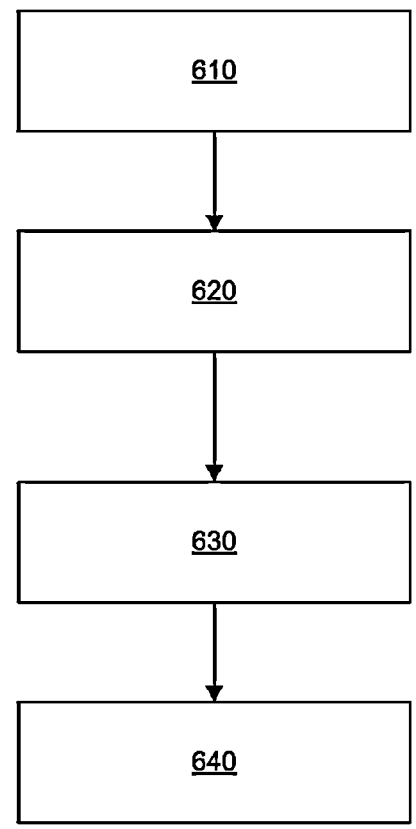
FIG. 12 is an example of a method.

FIG. 12 illustrates method 600 for forming a joint.

Method 600 may start by step 610 of holding, by holding and movement unit, a first cuttable element while the first cuttable element is being cut by a cutting element during multiple first cut iterations.

Step 610 may be followed by step 620 of executing, under a control of a controller, first movement commands for moving the first cuttable element, along a first axis, between one cut iteration to another to form a first requested pattern of recesses.

The first movement commands are generated based on a user request regarding the joint, and one or more cutting element parameters. Method 600 may include a preliminary step of generating the first movement commands. The preliminary step may include interacting with the user to obtain the user request regarding the joint—which may be a definition of the joint.

In order to form a joint another cut element needs to be shaped.

Step 620 may be followed by step 630 of holding, by holding and movement unit, a second cuttable element while the second cuttable element is being cut by the cutting element during multiple second cut iterations.

Step 630 may be followed by step 640 of executing, under the control of the controller, second movement commands for moving the second cuttable element, along the first axis, between one cut iteration to another to form a second requested pattern of recesses.

The second movement commands are generated based on a user request regarding the joint, and one or more cutting element parameters.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A system for forming a joint, the system comprises:
a controller;
a hold and movement unit that is configured to:
a. hold a first cuttable element while the first cuttable element is being cut by a cutting element during multiple first cut iterations; and
b. execute, under a control of the controller, first movement commands for moving the first cuttable element, along a first axis, between one cut iteration to another to form a first requested pattern of recesses;
wherein the first movement commands are generated based on a user request regarding the joint, and one or more cutting element parameters.

2. The system according to claim 1 wherein the hold and movement unit is configured to:
a. hold a second cuttable element while the second cuttable element is being cut by the cutting element during multiple second cut iterations; and
b. execute, under a control of the controller, second movement commands for moving the second cuttable element, along the first axis, between one cut iteration to another to form a second requested pattern of recesses;
wherein the second movement commands are generated based on the user request regarding the joint, and the one or more cutting element parameters.

3. The system according to claim 1 wherein the controller is configured control an execution of the first movement commands based on a progress of a cutting of the first cuttable element.

4. The system according to claim 3 comprising a man machine interface for receiving an indication of progress of the cutting of the first cuttable element.

5. The system according to claim 3 comprising a communication unit configured to receive over a communication link an indication of progress of the cutting of the first cuttable element.

6. The system according to claim 1 wherein the user request regarding the joint defines one or more spacings between recesses and widths of one or more recesses of the first requested pattern of recesses.

7. The system according to claim 1 wherein the user request regarding the joint defines one or more shapes of one or more recesses of the first requested pattern of recesses.

8. The system according to claim 1 wherein the controller is configured to generate the first movement commands based on the user request regarding the joint, and the one or more cutting element parameters.

9. The system according to claim 8 wherein the user request regarding the joint is provided following a selection, by the user, of a cutting element type, and at least one cutting element dimension.

10. The system according to claim 8 wherein the user request regarding the joint is provided following a selection, by the user, of a movement step.

11. The system according to claim 8 wherein the user request regarding the joint is provided following a selection, by the user, of a joint type.

12. The system according to claim 8 wherein the user request regarding the joint is provided following a selection, by the user, of a pressure value between the first cuttable element and a second cuttable element.

13. The system according to claim 1 wherein the controller is configured to receive the first movement commands.

14. The system according to claim 1 wherein the controller is configured to receive or generate third movement commands for moving a third cuttable element, along the first axis, between one cut iteration to another to form a third requested pattern of recesses; wherein the third requested pattern of recesses differs from the first requested pattern of recesses; wherein the movement and hold unit is configured to hold a third cuttable element while the third cuttable element is being cut by the cutting element during multiple third cut iterations; and execute, under the control of the controller, third movement commands for moving the third cuttable element, along the first axis, between one cut iteration to another to form the third requested pattern of recesses.

15. The system according to claim 1 wherein the hold and movement unit comprises a motor, a screw rotatable by the motor, a first interface that is movable along the screw upon a rotation of the screw, and a holder.

16. The system according to claim 15 wherein the first interface is mechanically coupled to the holder.

17. The system according to claim 15 comprising one or more height adjustment elements for adjusting a relative height between the holder and the first interface.

18. The system according to claim 1 wherein the hold and movement unit comprises a holder and one or more roll angle height adjustment elements for adjusting a roll angle of the holder.

19. The system according to claim 1 wherein the hold and movement unit comprises yaw angle adjustment elements for adjusting a yaw angle of the holder.

20. The system according to claim 1 wherein the hold and movement unit comprises a main chassis, user handles, and a cutting element environment interface that interfaces between the system and an environment of the cutting element.

21. The system according to claim 20 wherein the cutting element environment interface is a rail, and the environment of the cutting element comprises a recess that fits the rail.

22. The system according to claim 21 comprising yaw angle adjustment elements for changing a yaw angle between the chassis and the rail.

23. The system according to claim 1 comprising a man machine interface for receiving an indication of a completion of a cut iteration.

24. The system according to claim 1 comprising a man machine interface for receiving a request to restart a cut iteration.

25. The system according to claim 1 comprising a man machine interface for receiving a reset request for restarting a to restart a formation of the first requested pattern of recesses.

26. The system according to claim 1 comprising a safety mechanism for preventing a start of movement of the holding and movement unit towards the cutting element until there is at least a predefined distance between the first cuttable element and the cutting element.

27. A method for forming a joint, the method comprises:
holding, by holding and movement unit, a first cuttable element while the first cuttable element is being cut by a cutting element during multiple first cut iterations; and
executing, under a control of a controller, first movement commands for moving the first cuttable element, along a first axis, between one cut iteration to another to form a first requested pattern of recesses;
wherein the first movement commands are generated based on a user request regarding the joint, and one or more cutting element parameters.

28. The method according to claim 27, comprising:
holding, by holding and movement unit, a second cuttable element while the second cuttable element is being cut by the cutting element during multiple second cut iterations; and
executing, under the control of the controller, second movement commands for moving the second cuttable element, along the first axis, between one cut iteration to another to form a second requested pattern of recesses;
wherein the second movement commands are generated based on a user request regarding the joint, and one or more cutting element parameters.

* * * * *